(12) United States Patent
Ooe et al.

(10) Patent No.: US 8,448,479 B2
(45) Date of Patent: May 28, 2013

(54) ION ELUTING UNIT AND DEVICE LOADED WITH SAME

(75) Inventors: Hirokazu Ooe, Yao (JP); Yutaka Tateyama, Moriguchi (JP); Toshihiro Kamii, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1742 days.

(21) Appl. No.: 10/535,700

(22) PCT Filed: Nov. 10, 2003

(86) PCT No.: PCT/JP03/14268
§ 371 (c)(1),
(2), (4) Date: Jan. 27, 2006

(87) PCT Pub. No.: WO2004/048278
PCT Pub. Date: Jun. 10, 2004

(65) Prior Publication Data
US 2006/0164093 A1 Jul. 27, 2006

(30) Foreign Application Priority Data
Nov. 22, 2002 (JP) ................. 2002-340072

(51) Int. Cl.
*D06F 35/00* (2006.01)
*G01N 27/416* (2006.01)
(52) U.S. Cl.
USPC ........................................ 68/17 R; 324/432
(58) Field of Classification Search
USPC ........................................ 68/17 R; 324/432
See application file for complete search history.

(56) References Cited

U.S. PATENT DOCUMENTS

| 4,525,253 A | 6/1985 | Hayes et al. |
| 5,603,843 A * | 2/1997 | Snee .............................. 210/748 |
| 2002/0157962 A1* | 10/2002 | Robey et al. .................. 205/342 |
| 2003/0127398 A1* | 7/2003 | Bartl et al. .................... 210/748 |

FOREIGN PATENT DOCUMENTS

| CA | 2242101 A1 | 1/2000 |
| CA | 2242101 * | 2/2000 |
| CH | 662804 A5 | 10/1987 |
| JP | 7-501487 A | 2/1995 |
| JP | 7-43356 U | 8/1995 |
| JP | 08-192161 | 7/1996 |
| JP | 10-500614 A | 1/1998 |
| JP | 10-192863 A | 7/1998 |
| JP | 11-165174 A | 6/1999 |

(Continued)

OTHER PUBLICATIONS

Translation of Abstract for JP 2000-343081, Dec. 2000.*

(Continued)

*Primary Examiner* — Michael Barr
(74) *Attorney, Agent, or Firm* — Birch, Stewart, Kolasch & Birch, LLP

(57) ABSTRACT

In an ion elution unit, a drive circuit applies a voltage between electrodes to elute metal ions from the electrodes. Polarities of the electrodes are reversed cyclically with a voltage application halt period placed in-between. A current detection circuit detects the current flowing between the electrodes. A check of operation of the current detection circuit is carried out before the application of a voltage to the electrodes is started. The operation of the current detection circuit is started when a predetermined period of time passes after the application of a voltage to the electrodes is started.

14 Claims, 17 Drawing Sheets

FOREIGN PATENT DOCUMENTS

| | | |
|---|---|---|
| JP | 11-207352 A | 8/1999 |
| JP | 2000-325953 A | 11/2000 |
| JP | 2000-343081 * | 12/2000 |
| JP | 2000-343081 A | 12/2000 |
| JP | 2001-58189 A | 3/2001 |
| JP | 2001-276484 * | 10/2001 |
| JP | 2001-276484 A | 10/2001 |
| JP | 2001-279745 A | 10/2001 |
| JP | 2001-340281 A | 12/2001 |
| JP | 2002-263649 A | 9/2002 |
| KR | 00161040 B1 | 8/1998 |
| KR | 1020020037911 A | 5/2002 |
| WO | WO-93/22477 A1 | 11/1993 |
| WO | WO-95/27684 A1 | 10/1995 |
| WO | WO-97/19896 A1 | 6/1997 |

OTHER PUBLICATIONS

Translation of JP 2001-276484, Oct. 2001.*
Office Action mailed on Aug. 31, 2004 in respect of the corresponding Korean Utility Model Application.

* cited by examiner

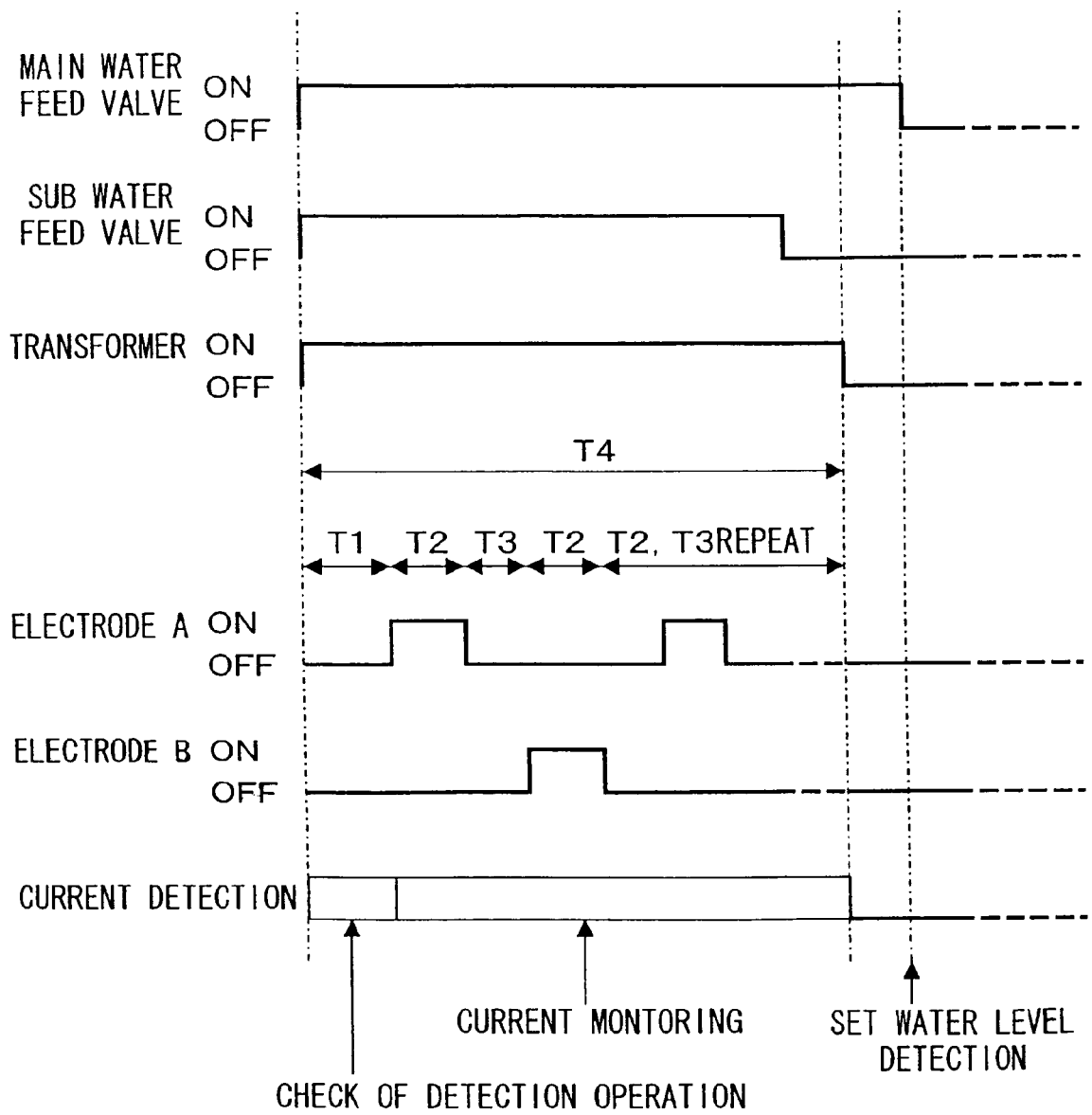

ION ELUTING UNIT AND DEVICE LOADED WITH SAME

TECHNICAL FIELD

The present invention relates to an ion elution unit for eluting metal ions having an antimicrobial effect into water, and also relates to an appliance, in particular a washer, that uses water mixed with metal ions generated by such ion elution unit.

BACKGROUND ART

When laundry is washed in a washer, it is common to add a treatment substance to water, in particular, to rinsing water. Typical examples of such treatment substances include softening and starching agents. In addition to these, in recent years, the demand has been increasing for treatment whereby laundry is subjected to antimicrobial treatment.

From the hygienic point of view, it is desirable to hang laundry in the sun to dry. However, in recent years, with the increase in the number of women who go to work, and with the increase in the number of nuclear families, there have been an increasing number of households where no one is at home in the daytime. In these households, there is no choice but to hang laundry indoors to dry. Even in households where someone is at home in the daytime, in a rainy weather, there is no choice but to hang laundry indoors to dry.

As compared with hanging laundry in the sun to dry, hanging it indoors tends to promote growth of bacteria and mold in laundry. This tendency is marked particularly when it takes time to dry laundry, as when humidity is high, such as in a rainy season, or when temperature is low. As the amount of bacteria and mold increases, laundry may become smelly. For this reason, in households where there is usually no choice but to hang laundry indoors to dry, there is a high demand for antimicrobial treatment of textile articles for the purpose of suppressing growth of bacteria and mold.

Nowadays, many clothes are available that have previously been treated with antimicrobial/deodorizing or antifungal treatment. However, it is difficult to replace all the textile articles in a household with those previously treated with antimicrobial/deodorizing treatment. Moreover, even with such textile articles, as they are washed repeatedly, the efficacy of antimicrobial/deodorizing treatment wears off.

Conceived under these circumstances was the idea of treating laundry with antimicrobial treatment every time it is washed. For example, Japanese Utility Model Laid-Open No. H5-74487 discloses an electric washer furnished with an ion generator that generates metal ions, such as silver ions or copper ions that exert a sterilizing effect. Japanese Patent Application Laid-Open No. 2000-93691 discloses a washer that generates an electric field with which to sterilize cleaning fluid. Japanese Patent Application Laid-Open No. 2001-276484 discloses a washer furnished with a silver ion adding unit that adds silver ions to cleaning water.

DISCLOSURE OF THE INVENTION

As for appliances utilizing metal ions having an antimicrobial effect, it is common to use an ion elution unit that elutes metal ions by applying a voltage between electrodes. For example, to add silver ions in water, an anode electrode made of silver is soaked in water together with a cathode electrode and a voltage is applied between them. A reaction of $Ag \rightarrow Ag^+ + e^-$ occurs on the anode and silver ions $Ag^+$ are eluted into the water. The elution of silver ions $Ag^+$ leads to the depletion of anode.

On cathode side, on the other hand, a reaction of $H^+ + e^- \rightarrow \frac{1}{2}H_2$ takes place regardless of the material of the electrode resulting in the generation of hydrogen gas and the deposition of compound of calcium contained in water as a scale on the surface of the electrode. Chloride or sulfide of the component metal is also precipitated on the electrode surface. Consequently, after the electrodes are used for a long time, a thick accumulation of scale, chloride or sulfide are formed on the surface of the cathode electrode. This accumulation hinders elution of metal ions, leading to unstable elution of metal ions and uneven depletion of electrodes.

In view of the above mentioned, it is an object of the present invention to provide an ion elution unit that can elute metal ions having an antimicrobial effect stably and efficiently for a long time. Still another object of the present invention is to provide an appliance, a washer in particular, that can avoid an unfavorable influence brought by the growth of microbes by adding metal ions generated by the ion elution unit to water.

To achieve the above object, according to one aspect of the present invention, an ion elution unit is configured in the following manner. In an ion elution unit that generates metal ions by applying a voltage between electrodes by a drive circuit, polarities of the electrodes are reversed cyclically with a voltage application halt period placed in-between. With this configuration, because of polarity reversal, scale or other substances precipitated during a cathode period are eluted during an anode period. This prevents accumulation of scale or other substances on the surface of electrode and ensures stable elution of metal ions. In addition, during the voltage application halt period between polarity reversal, the metal ions eluted from an electrode that was then an anode, can go far from the electrode. Thus, the metal ions do not return to the electrode where they have been eluted from even when the electrode is inverted to a cathode. As a result, electric power consumed in metal ion elution will not be wasted, moreover, the situation that the expected total amount of metal ions is not obtained can be avoided. Furthermore, when the ion elution unit is incorporated in an appliance, metal ions are evenly dispersed in water due to the existence of the voltage application halt period. Therefore, the antimicrobial effect of the metal ions is exerted evenly over a wide area.

According to the present invention, in the ion elution unit configured as described above, eluted metal ions are either silver ions, or copper ions, or zinc ions. With this configuration, an excellent sterilizing effect and an anti-mold effect of silver ions, copper ions and zinc ions can be utilized.

According to the present invention, in the ion elution unit configured as described above, application of a voltage to the electrodes is started after feeding of water is started. With this configuration, metal ion elution can certainly be started just after the start of voltage application to the electrodes, and the expected total amount of metal ion supply is obtained.

According to the present invention, in the ion elution unit configured as described above, the applied voltage is so varied that a constant current flows between the electrodes. As the amount of eluted metal ions is proportional to the current that flows between the electrodes in a unit time, with this configuration, metal ion elution can be stabilized, and the amount of eluted metal ions can be easily calculated.

According to the present invention, in the ion elution unit configured as described above, current flowing between the electrodes is detected by a current detection means, and the drive circuit is controlled based on the detection data, and a check of operation of the current detection means is carried out before the application of a voltage to the electrodes is started. With this configuration, as the check of operation of the current detection means is carried out before the cyclical application of a voltage to the electrodes is started, the possibility of erroneous detection by the current detection means is eliminated and thereby elution of metal ions at an improper ion concentration can be prevented beforehand.

According to the present invention, in the ion elution unit configured as described above, current flowing between the electrodes is detected by a current detection means, and the drive circuit is controlled based on the detection data, operation of the current detection means is started when a predetermined period of time passes after the application of a voltage to the electrodes is started. With this configuration, the detection is accurate because the check of operation of the current detection means is carried out not when the voltage application has just started and current is unstable, but when the current becomes stable.

According to the present invention, in the ion elution unit configured as described above, current flowing between the electrodes is detected by a current detection means, and the drive circuit is controlled based on the detection data, and when the current detection means detects abnormal current, a warning means notifies it to users. With this configuration, users can be informed that the ion elution unit can not elute the expected amount of metal ions due to abnormal current and the expected antimicrobial effect can not be obtained, and that the ion elution unit needs to be adjusted or repaired.

According to the present invention, in the ion elution unit configured as described above, even if the current detection means detects abnormal current, the warning means does not notify users of the abnormality on condition that normal current has been detected at least once during an ion elution process. With this configuration, because no abnormality notification is made even if the current detection means detects abnormal current, on condition that normal current has been detected at least once during an ion elution process, the operation of the ion elution unit is continued when temporal abnormality, due to noise for example, is mistakenly detected.

According to the present invention, in the ion elution unit configured as described above, current flowing between the electrodes is detected by a current detection means, and the drive means is controlled based on the detection data, and when the current detection means detects that the value of the current flowing between the electrodes is a predetermined level or under, the lengths of the voltage application period and/or the voltage application halt period or the ion elution period are adjusted. With this configuration, even when the current is too low to obtain the expected amount of metal ion elution, in other words, when it is difficult to elute metal ions, the shortage of metal ions can be compensated by adjusting the lengths of the voltage application period and/or the voltage application halt period or the ion elution period (a total time of voltage application to the electrodes and the voltage application halt period), and thereby the expected total amount of metal ions can surely be supplied.

According to the present invention, an ion eluting unit as described above is incorporated in an appliance so that the appliance uses water mixed with metal ions generated by the ion elution unit. With this configuration, it is possible to use water mixed with metal ions generated by the ion elution unit. For example, if the appliance is a dish washing machine, it is possible to treat eating utensils with antimicrobial treatment using metal ions and thereby enhance hygiene. If the appliance is a humidifier, it is possible to prevent proliferation of bacteria and algae in the water stored in its water tank and thereby prevent bacteria and algae spores from being spread into the air and causing an infection or allergy in a person who inhaled them.

According to the present invention, in the appliance configured as described above, the ion elution period is adjusted according to the amount of water used. With this configuration, as the ion elution period (a total time of voltage application to the electrodes and the voltage application halt period) is adjusted according to the amount of water used, the metal ion concentration in supplied water is constant. By this, it is avoided that water with excessive metal ion concentration makes things to be treated be smeared, or water with insufficient metal ion concentration fails to exert antimicrobial effect.

According to the present invention, in the appliance configured as described above, the lengths of the voltage application period and/or the voltage application halt period are adjusted according to the amount of water used or the length of ion elution period. With this configuration, the variation in the amount of eluted metal ions due to the variation in the amount of water used or the length of ion elution period can be compensated by adjusting at least one of the voltage application period or the voltage application halt period. Consequently, the electrodes are depleted evenly. Furthermore, neither of electrodes is used with its polarity fixed for a long time, and the electrode used as a cathode for a long time accumulates large amount of scale on its surface only to hinder elution of metal ions when it is inverted to an anode.

According to the present invention, in the appliance configured as described above, a flow rate detection means is provided to measure the volume of water flow in the ion elution unit, and the lengths of the voltage application period and/or the voltage application halt period or the ion elution period is adjusted based on the measurement. When the appliance is connected to a faucet to use water, the volume of water flow in the ion elution unit is not constant due to the variations in water pressure or conduit resistance in each house, even if the valve in the appliance keeps constant degree of opening. With this configuration, as the amount of metal ions being eluted is adjusted according to the water flow rate, water is supplied with metal ions evenly dispersed in it, and the antimicrobial effect of the metal ions is evenly exerted on things to be treated.

According to the present invention, in the appliance configured as described above, when the current detection means detects abnormal current, specified countermeasures are adapted. With this configuration, the ion elution unit will not continue normal operation mode with the expected function of giving antimicrobial effect being lacked. The specified countermeasures are, for example, a temporary stop of the appliance operation, continuation of the appliance operation with an indication or notification by notification means such as buzzers or lamps, and continuation of the appliance operation accompanied with disablement of the next operation informing users of the fact that the ion elution unit is in an abnormal state.

According to the present invention, in the appliance configured as described above, the specified countermeasure is a temporary stop of the appliance operation. With this configuration, the ion elution unit surely will not continue normal operation mode with the expected function of giving antimicrobial effect being lacked.

According to the present invention, in the appliance incorporating the above-mentioned ion elution unit, when the current detection means detects that the value of the current flowing between the electrodes is a predetermined level or under, the volume of water flow fed to the ion elution unit is reduced and the ion elution period is extended. With this configuration, even when the current is too low to obtain the expected amount of metal ion elution, in other words, when it is difficult to elute metal ions, the elution of expected amount of metal ions is achieved by the time when water-feeding is finished by the extension of water-feeding time derived from the reduction of the volume of water flow, and by the extension of the ion elution period.

According to the present invention, in the appliance configured as described above, the appliance is a washer. Thus, the following effects are obtained.

When the washer incorporates the above-mentioned ion elution unit and adds metal ions generated by the ion elution unit, added in water in water, the laundry is treated with antimicrobial treatment using metal ions and thereby prevented proliferation of bacteria and mold and generation of an offensive smell.

In the washer, when the ion elution period (a total time of voltage application to the electrodes and the voltage application halt period) is adjusted according to the amount of water used, water with a constant metal ion concentration is supplied to laundry. By this, it is avoided that water with excessive metal ion concentration makes laundry be smeared, or, water with insufficient metal ion concentration fails to exert antirmicrobial effect on laundry.

In the washer, when the lengths of the voltage application period and/or the voltage application halt period are adjusted according to the amount of water used and/or the length of ion elution period, the variation in the amount of eluted metal ions due to the variation in the amount of water used or the length of ion elution period can be compensated by adjusting at least one of the voltage application period and the voltage application halt period. Consequently, the electrodes are depleted evenly. Furthermore, neither of electrodes is used with its polarity fixed for a long time, and the electrode used as a cathode for a long time accumulates large amount of scale on its surface only to hinder elution of metal ions when it is inverted to an anode. Therefore, the washer maintains its ability to treat laundry with antimicrobial treatment stable for a long period.

In the washer, when a flow rate detection means is provided to measure the volume of water flow in the ion elution unit, and the lengths of the voltage application period and/or the voltage application halt period or the ion elution period is adjusted based on the measurement, the amount eluted metal ions is adjusted according to the water flow rate. By this, regardless of how the washer installed in a house, water with metal ions evenly dispersed in it is supplied to the washer, and the antimicrobial effect of the metal ions is evenly exerted on laundry. Therefore, the washer can minimize the agitation process to distribute metal ions to all portions of laundry.

In the washer, when the current detection means detects abnormal current, specified countermeasures are adapted. With this configuration, the washer will not execute usual operations with the ion elution unit lacking its expected function of giving antimicrobial effect.

In the washer, when the specified countermeasure is a temporary stop of the appliance operation, it is surely avoided that users continue the use of the washer without noticing that the ion elution unit lacks the expected function of antimicrobial treatment of laundry.

In the washer, when the current detection means detects that the value of the current flowing between the electrodes is a predetermined level or under, the volume of water flow fed to the ion elution unit is reduced and the ion elution period is extended. With this configuration, even when the current is too low to obtain the expected amount of metal ion elution, in other words, when it is difficult to elute metal ions, the elution of expected amount of metal ions is achieved by the time when water-feeding is finished by the extension of water-feeding time derived from the reduction of the volume of water flow, and by the extension of the ion elution period. Therefore, laundry is always stably treated with antimicrobial treatment.

In the washer, even if the current detection means detects abnormal current, the warning means does not notify users of the abnormality on condition that normal current has been detected at least once during an ion elution process, and thereby the washer can continue operations and finish the laundry washing session when temporal abnormality, due to noise for example, is mistakenly detected In the washer, the current flowing between the electrodes is detected by a current detection means, and the drive means is controlled based on the detection data, and when the current detection means detects that the value of the current flowing between the electrodes is a predetermined level or under, the lengths of the voltage application period and/or the voltage application halt period or the ion elution period are adjusted. With this configuration, even when the current is too low to obtain the expected amount of metal ion elution, in other words, when it is difficult to elute metal ions, the shortage of metal ions can be compensated by adjusting the lengths of the voltage application period and/or the voltage application halt period or the ion elution period (a total time of voltage application to the electrodes and the voltage application halt period), and thereby the washer can treat laundry with antimicrobial treatment using expected total amount of metal ions.

Alternatively, according to the present invention, in an ion elution unit that generates silver ions by applying a voltage between silver electrodes disposed in a water feed passage, polarities of the electrodes are reversed cyclically. With this configuration, silver ions are eluted into the water fed via the water feed passage and attach to the objects for which the water is used, and the objects are sterilized and the mold on them is removed. And precipitation of scale or other substances is prevented by polarity reversal, and thereby silver ions are eluted stably.

BRIEF DESCRIPTION OF DRAWINGS

FIG. 17 is a sequence chart illustrating relations between operations of each component and polarity reversal of electrodes in an ion elution process.

BEST MODE FOR CARRYING OUT THE INVENTION

An embodiment of the present invention will be described with reference to Figures.

Figure 1:
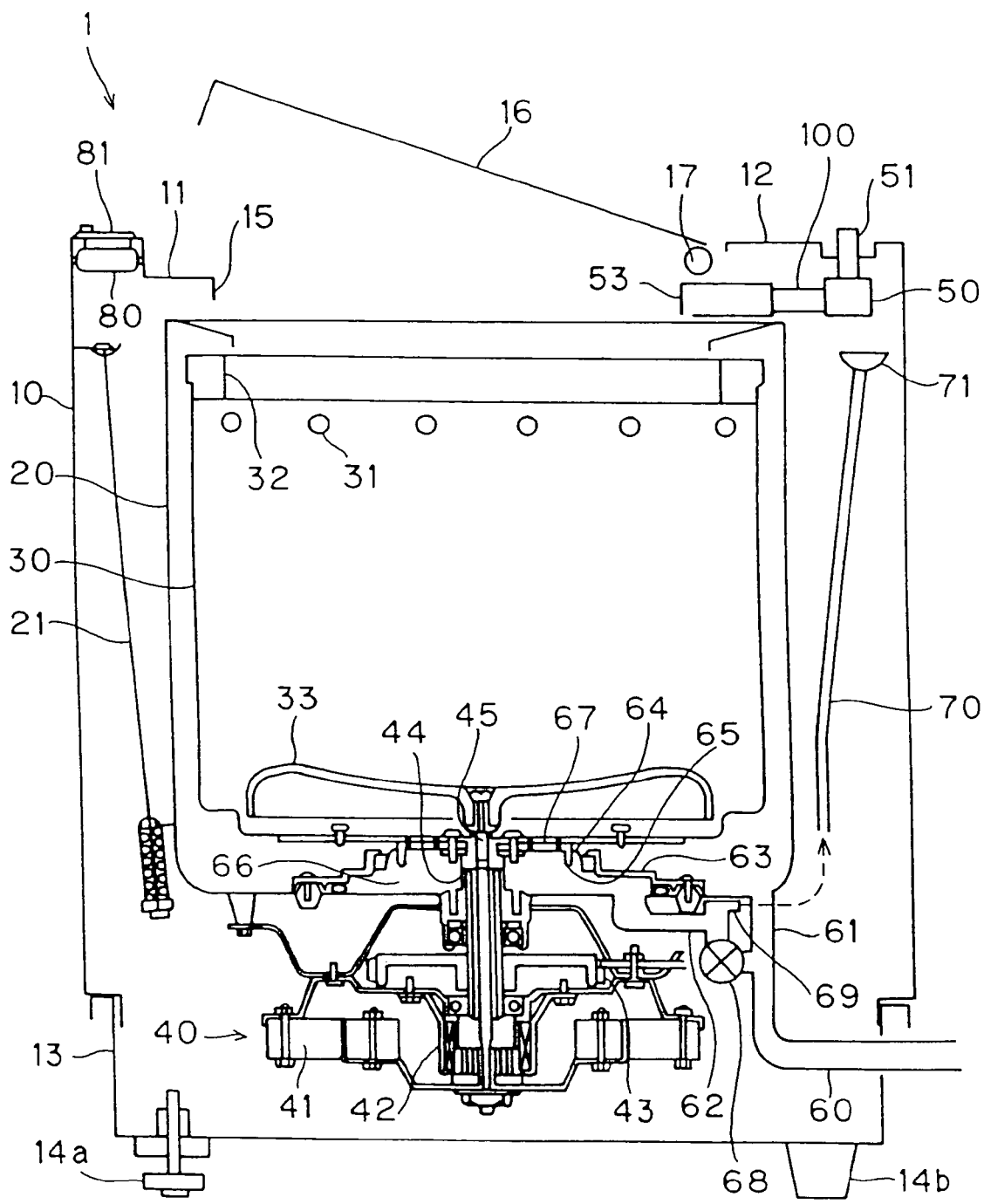
FIG. 1 is a vertical sectional view of a washer in an embodiment of the present invention.

FIG. 1 is a vertical sectional view showing the overall construction of a washer 1. The washer 1 is of an automatic type, and has a cabinet 10. The box-shaped cabinet 10 is formed of metal or synthetic resin, and has openings at its top and bottom. The top opening of the cabinet 10 is covered with a top plate 11, which is formed of synthetic resin and is fixed to the cabinet 10 with screws. In FIG. 1, front and rear of the washer 1 point leftward and rightward, respectively. A rear portion of a top surface of the top plate 11 is covered with a back panel 12, which is formed of synthetic resin and is fixed to the cabinet 10 or the top plate 11 with screws. The bottom opening of the cabinet 10 is covered with a base 13, which is formed of synthetic resin and is fixed to the cabinet 10 with screws. None of the screws mentioned thus far are shown in the figure.

Feet 14a and 14b for supporting the cabinet 10 on a floor are disposed at the four corners of the base 13. The rear feet 14b are fixed feet integrally formed with the base 13. The front feet 14a are height-adjustable screw feet, and turning them levels the washer 1.

The top plate 11 has a laundry inlet opening 15 through which laundry is put in a washing tub described later. The laundry inlet opening 15 is covered with a lid 16 from above. The lid 16 is coupled to the top plate 11 with a hinge 17 so as to be pivotable in a vertical plane.

A water tub 20 and a washing tub 30 that serves also as a squeezing tub are disposed inside the cabinet 10. Both the water tub 20 and the washing tub 30 are shaped in a cylindrical cup open at its top, and the two tubs are arranged concentrically with their axes vertical and with the washing tub 30 placed inside the water tub 20. The water tub 20 is suspended from the cabinet 10 with suspension members 21. The suspension members 21 connect a lower outer surface of the water tub 20 to four inner corners of the cabinet 10, and support the water tub 20 in such a way that it can swing in a horizontal plane.

The washing tub 30 has a circumferential wall that widens upward with a gentle taper. This circumferential wall has a plurality of drain holes 31 formed in a ring-shaped arrangement around its topmost portion, and has, other than these drain holes, no opening that permits passage of liquid. The washing tub 30 is of so-called "holeless" type. A ring-shaped balancer 32 is attached to a rim of the top opening of the washing tub 30 to suppress vibration produced by the washing tub 30 when it rotates at high speed for squeezing of laundry. Inside the washing tub 30, on its bottom surface, a pulsator 33 is disposed to produce a current of washing or rinsing water inside the tub 30.

The water tub 20 has a drive unit 40 fitted to its bottom surface from below. The drive unit 40 includes a motor 41, a clutch mechanism 42, and a brake mechanism 43, and has a squeezing spindle 44 and a pulsator spindle 45 protruding from its center upward. The squeezing spindle 44 and the pulsator spindle 45 form a double-spindle structure, with the pulsator spindle 45 placed inside the squeezing spindle 44. The two spindles both penetrate the water tub 20. The squeezing spindle 44 is then connected to the washing tub 30 so as to support it. On the other hand, the pulsator spindle 45 further penetrates the washing tub 30, and is then connected to the pulsator 33 to support it. Sealing members for preventing leakage of water are disposed between the squeezing spindle 44 and the water tub 20 and between the squeezing spindle 44 and the pulsator spindle 45.

A water feed valve 50, which is operated electro-magnetically, is disposed inside a space below the back panel 12. The water feed valve 50 has a connection pipe 51 that penetrates the back panel 12 to extend upward. A water feed hose (not shown) through which to supply clean water such as tap water to the washer is connected to the connection pipe 51. The water feed valve 50 feeds water to a water feed mouth 53 in a shape of container that is placed above the inside of the water tub 20. The water feed mouth 53 has a structure as shown in FIG. 2.

Figure 2:
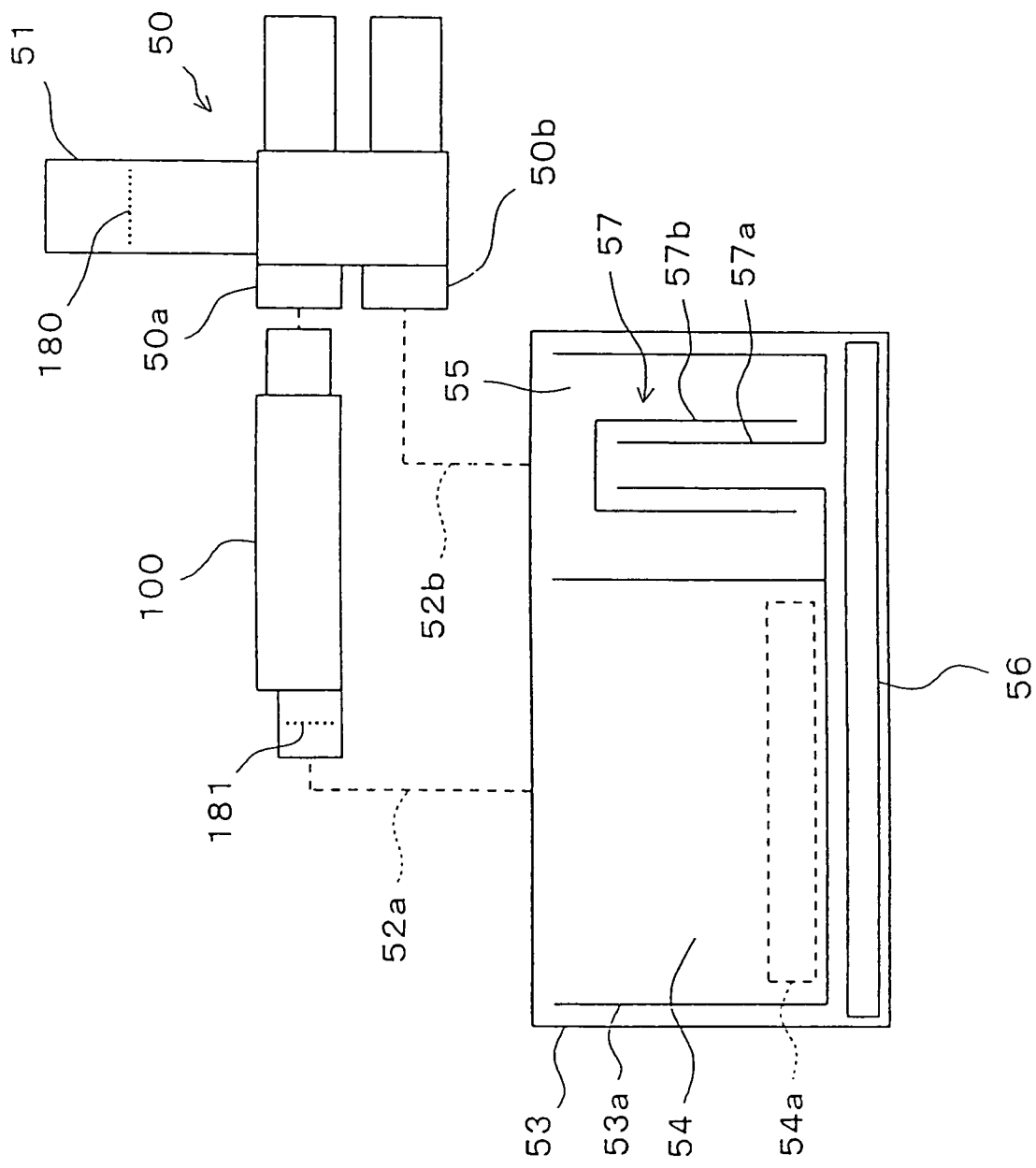
FIG. 2 is a schematic vertical sectional view of a water feed mouth.

FIG. 2 is a schematic vertical sectional view of the water feed mouth 53. The water feed mouth 53 has an opening in its front, and through the opening, a drawer 53a is inserted. The drawer 53a has its interior divided into a plurality of sections (the embodiment of the present has two sections, that is, a left-hand section and a right-hand section). The left-hand section is a detergent chamber 54 that serves as a storage space for detergent. The right-hand section is a treatment agent chamber 55 that serves as a storage space for treatment agent for laundry washing. A bottom of the detergent chamber 54 is provided with a water outlet 54a which is open toward an inside of the water feed mouth 53. A siphon 57 is disposed in the treatment agent chamber 55. The water feed mouth 53 has, below the bottom of the drawer 53a, a water outlet 56 through which water is fed into the washing tub 30.

The siphon 57 is composed of an inner pipe 57a that extends vertically upward from a bottom surface of the treatment agent chamber 55 and a cap-shaped outer pipe 57b with which the inner pipe 57a is capped. Between the inner pipe 57a and the outer pipe 57b is left a gap that permits passage of water. The inner pipe 57a, at its bottom, is open to a bottom of the water feed mouth 53. A predetermined gap is kept between a bottom end of the outer pipe 57b and a bottom surface of the treatment agent chamber 55 so as to serve as a water inlet. When water is poured into the treatment agent chamber 55 up to a level higher than a top end of the inner pipe 57a, a principle of siphon works to cause water to flow through the siphon 57 out of the treatment agent chamber 55 and then drop to the bottom of the water feed mouth 53, water is then poured into the washing tub 30 through the water outlet 56.

The water feed valve 50 is composed of a main water feed valve 50a and a sub water feed valve 50b. The main water feed valve 50a allows relatively large flow of water, while the sub water feed valve 50b allows relatively small flow of water. Setting the flow of water large or small is achieved by making the internal structure of the main water feed valve 50a and that of the sub water feed valve 50b be different from each other, or by making the internal structures of both valves same and combining them with flow-limiting members having different throttling ratio. The connection pipe 51 is shared between the main and sub water feed valves 50a and 50b.

The main water feed valve 50a is connected to an opening in a ceiling of the water feed mouth 53 by way of a main water feed passage 52a. This opening is open toward the detergent chamber 54, so that a large amount of water flow from the main water feed valve 50a is poured into the detergent chamber 54 through the main water feed passage 52a. The sub water feed valve 50b is connected to the opening in the ceiling of the water feed mouth 53 by way of a sub water feed passage 52b. This opening is open toward the treatment agent chamber 55, so that a small amount of water flow from the sub water feed valve 50b is poured into the treatment agent chamber 55 through the sub water feed passage 52b. That is, a passage that runs from the main water feed valve 50a through the detergent chamber 54 to the washing tub 30 is separate from a passage that runs from the sub water feed valve 50b through the treatment agent chamber 55 to the washing tub 30.

Back in FIG. 1, to the bottom of the water tub 20 is fitted a drain hose 60 through which water is drained out of the water tub 20 and the washing tub 30. Water flows into the drain hose 60 from drain pipes 61 and 62. The drain pipe 61 is connected to a rather peripheral portion of the bottom surface of the water tub 20, and the drain pipe 62 is connected to a rather central portion of the bottom surface of the water tub 20.

Inside the water tub 20, on its bottom surface, there is fixed a ring-shaped partition wall 63 in such a way as to enclose the portion of the water tub 20 where the drain pipe 62 is connected to it. The partition wall 63 is fitted with a circular sealing member 64 at its top. The sealing member 64 is kept in contact with a circumferential surface of a disk fixed to an outer bottom surface of the washing tub 30 so as to form a separate drain space 66 between the water tub 20 and the washing tub 30. The drain space 66 communicates with an interior of the washing tub 30 through a drain outlet 67 formed in the bottom of the washing tub 30.

The drain pipe 62 is provided with a drain valve 68 that is operated electro-magnetically. In a portion of the drain pipe 62, on the upstream side of the drain valve 68, an air trap 69 is disposed. A lead pipe 70 extends from the air trap 69. The lead pipe 70 is, at its top end, connected to a water level switch 71.

A controller 80 is disposed in a front portion of the cabinet 10, beneath the top plate 11. The controller 80 receives instructions from users via an operation/display panel 81 disposed on the top surface of the top plate 11, and sends operation commands to the drive unit 40, the water feed valve 50, and the drain valve 68. The controller 80 also sends display commands to the operation/display panel 81. The controller 80 includes a drive circuit for driving an ion elution unit described later.

A flow rate detection means 185 is disposed in the water feed passage running from the main water feed valve 52a to the main water feed passage. The flow rate detection means 185 can be a flow meter of a commonly used type. The flow detection means 185 is illustrated as being attached to the water feed valve 50 in FIG. 1, though its disposition is not limited to the illustrated place. The flow detection means 185 can be disposed at the ion elution unit 100 or at the water feed mouth 53. Flow rate detection can also be made by calculation using water level change per unit time detected by the water level switch 71 or the time needed for unit water level change as elements of calculation.

How the washer 1 operates will now be described. First, the lid 16 is opened, and laundry is put into the washing tub 30 through the laundry inlet opening 15. The drawer 53a is pulled out from the water feed mouth 53 and a detergent is put in the detergent chamber 54 in the drawer 53a. A treatment agent (softening agent) is put in the treatment agent chamber 55. The treatment agent (softening agent) can be put there in the middle of a laundry washing session, or may not be put when unnecessary. After the detergent and the treatment agent (softening agent) are set, the drawer 53a is pushed back into the water feed mouth 53.

After the detergent and the treatment agent (softening agent) are made ready for addition in this way, the lid 16 is closed, and a desired course of laundry washing is selected by operating a group of operation buttons on the operation/display panel 81. By pressing a start button subsequently, a session of laundry washing is executed according to the flow charts shown in FIGS. 10 through 13.

Figure 10:
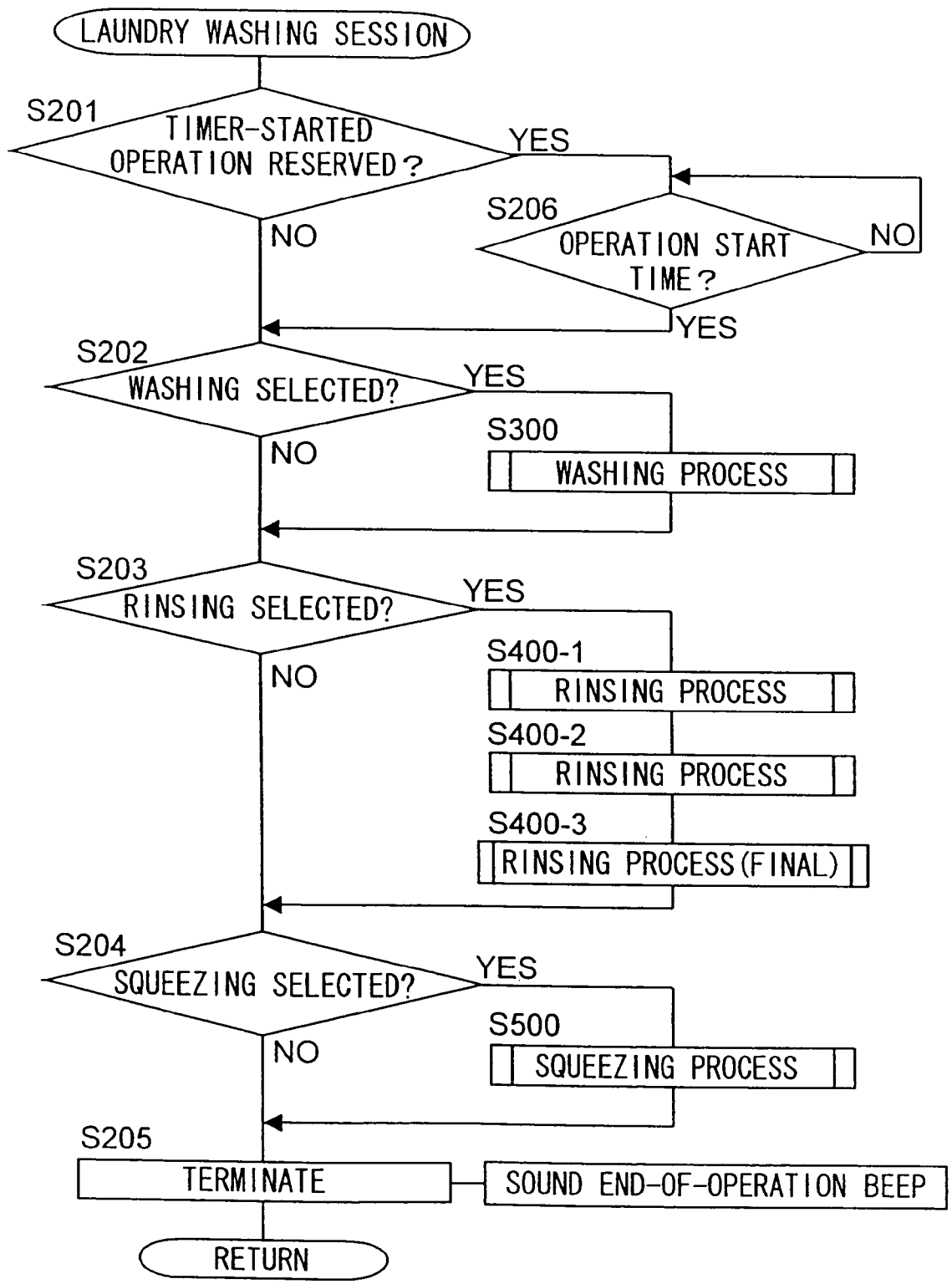
FIG. 10 is a flow chart of an entire session of laundry washing.

FIG. 10 is a flow chart showing the entire session of laundry washing. In step S201, laundry washing is started at a previously set time. Whether a timer-started operation is selected or not is checked. If a timer-started operation is selected, the flow proceeds to step S206; if not, the flow proceeds to step S202.

In step S206, whether the operation start time has come or not is checked. If the operation start time has come, the flow proceeds to step S202.

In step S202, whether a washing process is selected or not is checked. If a washing process is selected, the flow proceeds to S300. How the washing process in step S300 is executed will be described later with reference to the flow chart shown in FIG. 11. On completion of the washing process, the flow proceeds to step S203. If no washing process is selected, the flow proceeds directly from step S202 to step S203.

In step S203, whether a rinsing process is selected or not is checked. If a rinsing process is selected, the flow proceeds to S400. How the rinsing process in step S400 is executed will be described later with reference to the flow chart shown in FIG. 12. In FIG. 10, the rinsing process is repeated three times, and each step of the process is shown with a step number with a suffix number added such as "S400-1," "S400-2" and "S400-3." The number of times of the rinsing process is set at users' discretion. In this case, "S400-3" is a final rinsing process.

On completion of the rinsing process, the flow proceeds to step S204. If no rinsing process is selected, the flow proceeds directly from step S203 to step S204.

In step S204, whether a squeezing process is selected or not is checked. If a squeezing process is selected, the flow proceeds to S500. How the squeezing process in step S500 is executed will be described later with reference to the flow chart shown in FIG. 13. On completion of the squeezing process, the flow proceeds to step S205. If no squeezing process is selected, the flow proceeds directly from step S204 to step S205.

In step S205, termination of operation of the controller 80, in particular a processing unit (microcomputer) therein, is automatically executed in accordance with a predetermined procedure. In addition, the completion of laundry washing session is indicated by sounding an operation-completion beep. On completion of all the operations, the washer 1 goes back into a stand-by state in preparation for a new session of laundry washing.

Next, with reference to FIGS. 11 through 13, the individual processes of washing, rinsing, and squeezing will be described.

Figure 11:
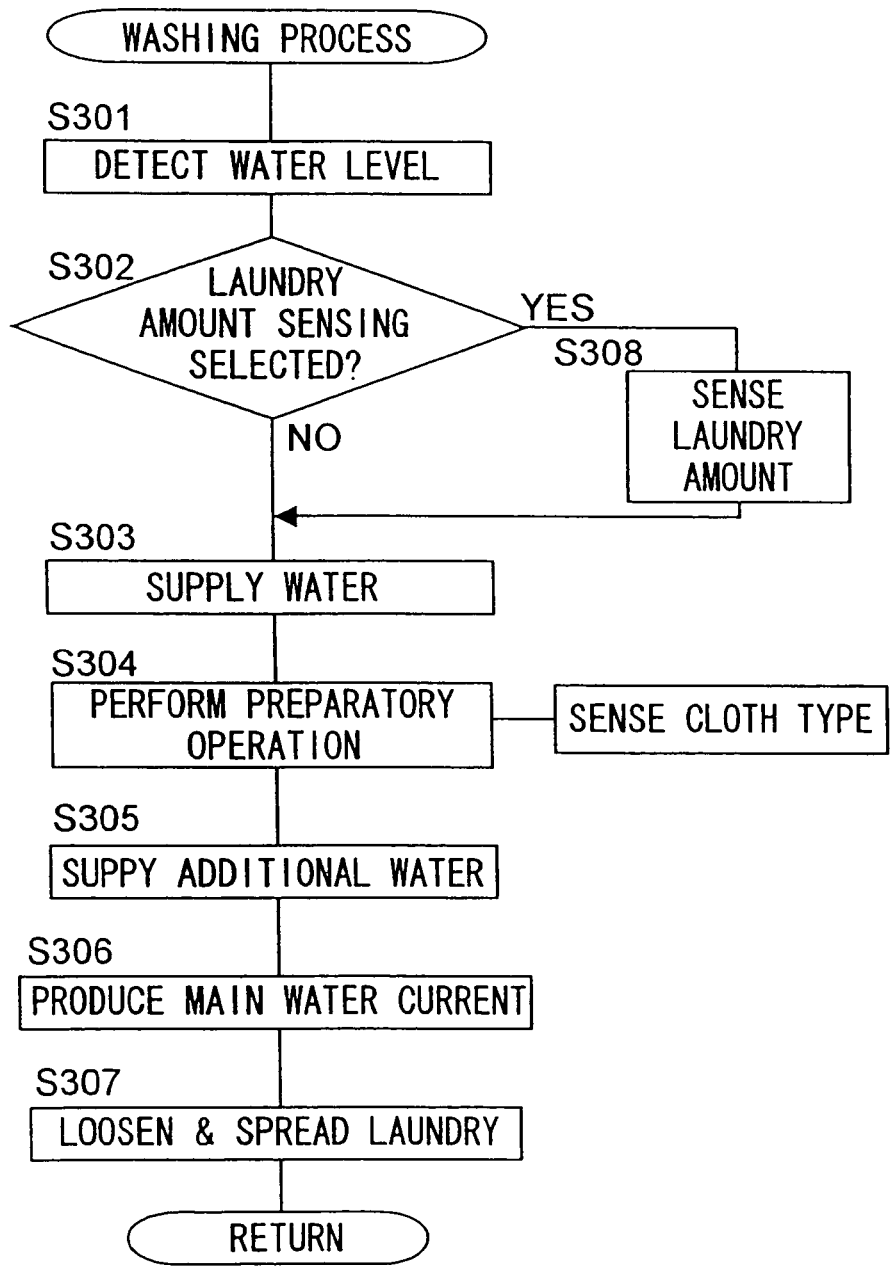
FIG. 11 is a flow chart of a washing process.
Figure 12:
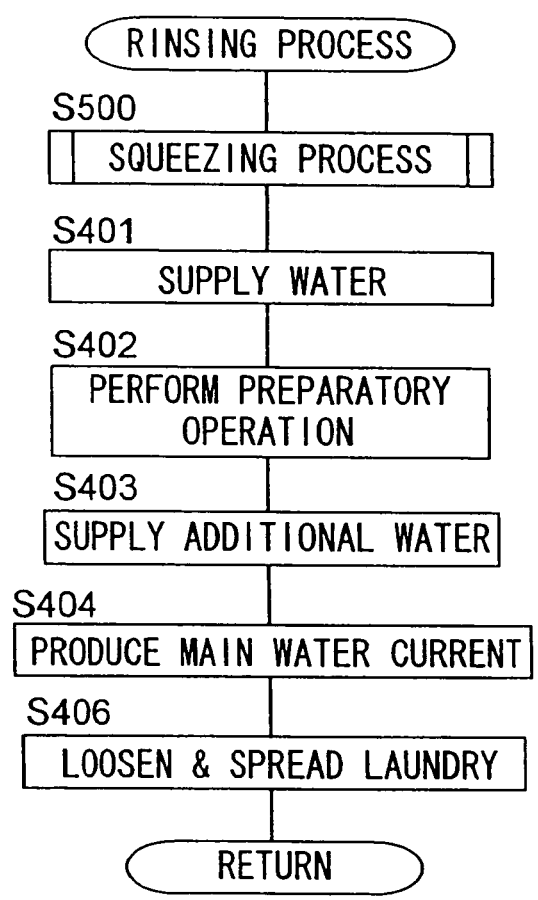
FIG. 12 is a flow chart of a rinsing process.

FIG. 11 is a flow chart of the washing process. In step S301, the water level inside the washing tub 30 as sensed by the water level switch 71 starts being monitored. In step S302, whether laundry amount sensing is selected or not is checked. If laundry amount sensing is selected, the flow proceeds to step S308; if not, the flow proceeds directly from step S302 to S303.

In step S308, the amount of laundry is measured on the basis of load of rotation of the pulsator 33. On completion of laundry amount sensing, the flow proceeds to step S303.

In step S303, the main water feed valve 50a is opened, and water is poured into the washing tub 30 through the water feed mouth 53. Since the main water feed valve 50a is set for large flow of water, water fills the washing tub 30 rapidly. The detergent agent put into the detergent chamber 54 is completely washed away by the large flow of water and mixed with it, and enters the washing tub 30. The drain valve 68 remains closed. When the water level switch 71 detects the set water level, the main water feed valve 50a is closed. The flow then proceeds to step S304.

In step S304, a preparatory operation is performed. The pulsator 33 is rotated repeatedly in forward and then reverse directions to agitate the laundry and water so that the laundry is fully dipped in water. This permits the laundry to absorb an ample amount of water, and permits air trapped in many parts of the laundry to escape. If, as a result of the preparatory operation, the water level as detected by the water level switch 71 becomes lower than at the beginning, then, in step S305, the main water feed valve 50a is opened to supply additional water to recover the set water level.

If a course of laundry washing including "cloth type sensing" is selected, when the preparatory operation is performed, the type of cloth is sensed. On completion of the preparatory operation, the change of the water level from the set water level is detected, and, if the drop in the water level is greater than a predetermined amount, the laundry is judged to be of the highly water-absorbent cloth type.

When, in step S305, the set water level is stably obtained, the flow proceeds to step S306. According to the settings made by users, the motor 41 rotates the pulsator 33 in a predetermined pattern so as to produce, in the washing tub 30, a main current of water for washing. With this main current of water, the laundry is washed. The squeezing spindle 44 remains braked by the brake mechanism 43 so that, even when the washing water and the laundry move, the washing tub 30 does not rotate.

On completion of the period in which the laundry is washed with the main current of water, the flow proceeds to step S307. In step S307, the pulsator 33 is rotated repeatedly in the forward and then reverse directions at short time intervals. This permits the laundry to loosen, and thereby permits it to spread evenly in the washing tub 30. This is done in preparation for squeezing rotation of the washing tub 30.

Next, with reference to the flow chart shown in FIG. 12, the rinsing process will be described. First, in step S500, the squeezing process is executed, of which a description will be given later with reference to the flow chart shown in FIG. 13. On completion of squeezing, the flow proceeds to step S401. In step S401, the main water feed valve 50a is opened, and water is supplied up to the set water level.

On completion of the supply of water, the flow proceeds to step S402. In step S402, a preparatory operation is performed. During the preparatory operation performed in step S402, laundry getting attached to the washing tub 30 in step S500 (squeezing process) is separated, soaked into water so that the laundry thoroughly absorbs water.

On completion of the preparatory operation, the flow proceeds to step S403. If, as a result of the preparatory operation, the water level as detected by the water level switch 71 becomes lower than at the beginning, the main water feed valve 50a is opened to supply additional water to recover the set water level.

After recovering the set water level in step S403, the flow then proceeds to step S404. According to the settings made by users, the motor 41 rotates the pulsator 33 in a predetermined pattern so as to produce, in the washing tub 30, a main current of water for rinsing. With this main current of water, the laundry is rinsed. The squeezing spindle 44 remains braked by the brake mechanism 43 so that, even when the rinsing water and the laundry move, the washing tub 30 does not rotate.

On completion of the period in which the laundry is rinsed with the main current of water, the flow proceeds to step S406.

In step S406, the pulsator 33 is rotated repeatedly in the forward and then reverse directions at short time intervals. This permits the laundry to loosen, and thereby permits it to spread evenly in the washing tub 30. This is done in preparation for squeezing rotation.

In the above description, rinsing is assumed to be performed with rinsing water stored in the washing tub 30. This is called "rinsing with stored water." It is, however, also possible to perform rinsing with always replenishing fresh water, which is called "rinsing with pouring water," or to perform rinsing with water kept supplied from the water feed mouth 53 while the washing tub 30 is rotated at a low speed, which is called "shower rinsing."

In the final rinsing process, different sequence from the above is executed. This will be described in details later.

Next, with reference to the flow chart shown in FIG. 13, the squeezing process will be described. First, in step S501, the drain valve 68 is opened. The washing water in the washing tub 30 is drained through the drain space 66. The drain valve 68 remains open during the squeezing process.

When most of the washing water has exited from the laundry, the clutch mechanism 42 and the brake mechanism 43 are switched over. The timing for switching over of the clutch mechanism 42 and the brake mechanism 43 is either before or at the same time of starting of draining of water. The motor 41 now rotates the squeezing spindle 44. This causes the washing tub 30 to start squeezing rotation. The pulsator 33 rotates together with the washing tub 30.

When the washing tub 30 rotates at a high speed, the laundry is pressed against the inner circumferential wall of the washing tub 30 by the centrifugal force. The washing water present in the laundry also gathers on the inner surface of the circumferential wall of the washing tub 30, and, since the washing tub 30 widens upward in a tapered shape as described earlier, the washing water driven by the centrifugal force rises along the inner surface of the washing tub 30. When the washing water reaches the top end of the washing tub 30, it is drained through the drain holes 31. The washing water that has exited from the drain holes 31 hits the inner surface of the water tub 20, and then flows down along the inner surface of the water tub 20 to the bottom of the water tub 20. The washing water is then drained out of the cabinet 10 through the drain pipe 61 and then through the drain hose 60.

Figure 13:
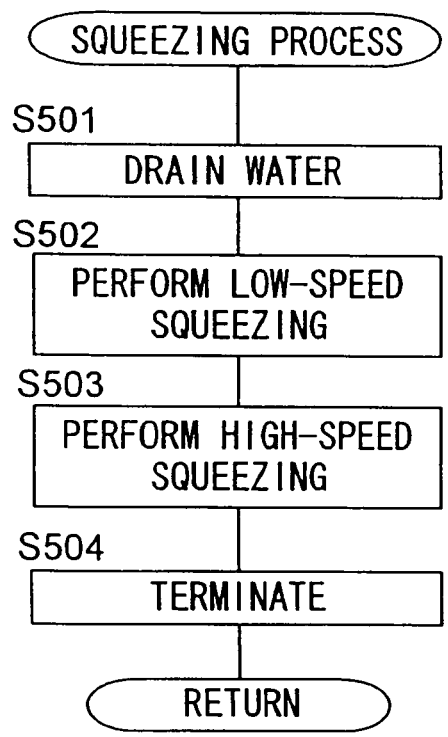
FIG. 13 is a flow chart of a squeezing process.

In the flow shown in FIG. 13, after squeezing is performed at a relatively low speed in step S502, squeezing is performed at high speed in step S503. On completion of step S503, the flow proceeds to step S504. In step S504, the supply of electric power to the motor 41 is stopped and termination operation is done for stopping.

The washer 1 is furnished with an ion elution unit 100. The ion elution unit 100 is connected to the downstream side of the main water feed pipe 52a. Now, with reference to FIGS. 3 through 9, the structure and functions of the ion elution unit 100 and the purpose for which it is incorporated in the washer 1 will be described.

Figure 3:
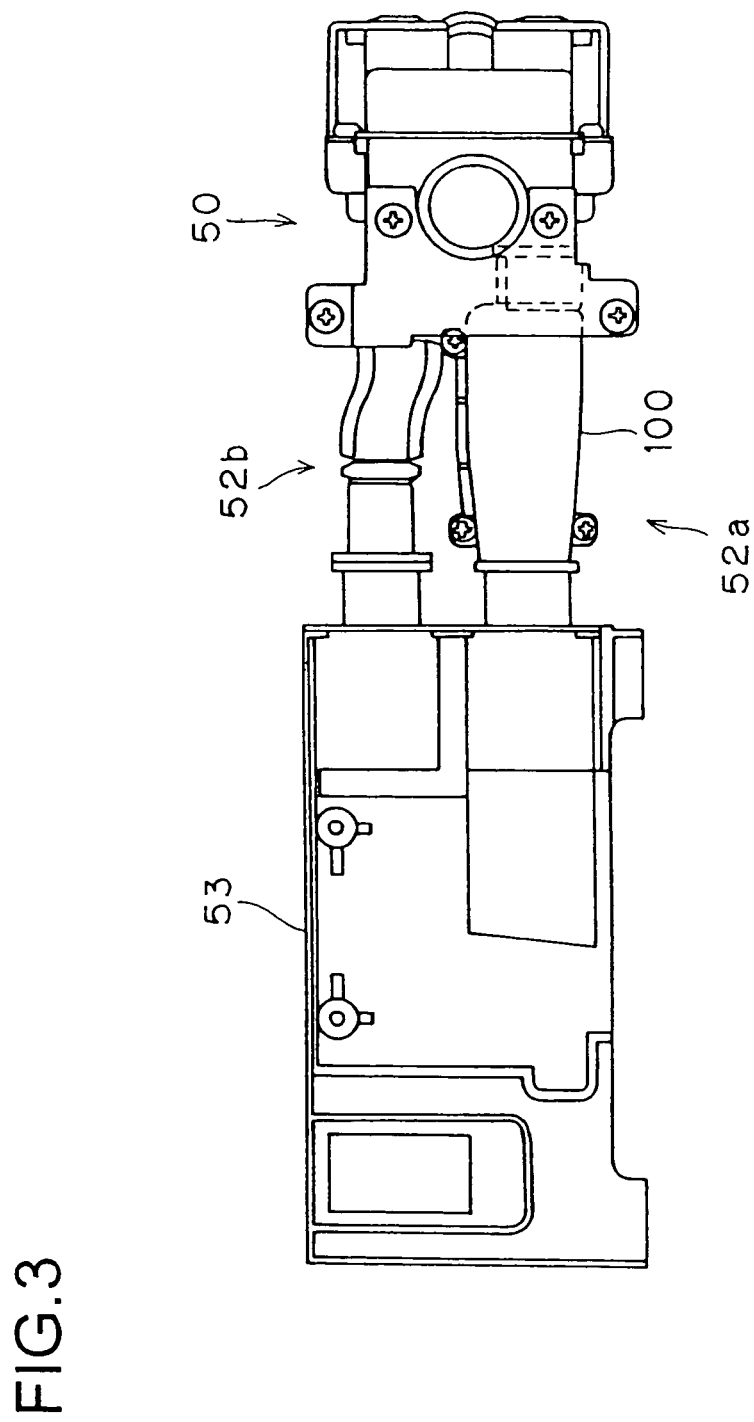
FIG. 3 is a partial top view of an interior of the washer.

FIG. 3 is a partial top view indicating the layout of the ion elution unit 100 and the water feed mouth 53. The ion elution unit 100 is connected directly to the main water feed valve 50a and the water feed mouth 53 on both ends. In other words, the ion elution unit 100 independently composes the entire main water feed passage 52a. The sub water feed passage 52b is constructed by connecting the pipe, which protrudes from the water feed mouth 53, to the sub water feed valve 50b with a hose. In the schematic view of FIG. 1, the water feed valve 50, the ion elution unit 100 and the water feed mouth 53 are arranged in line with front-to-rear axis of the washer 1. However, in an actual washer, they are not arranged in that way but arranged in line with left-to-right axis of the washer 1.

Figure 4:
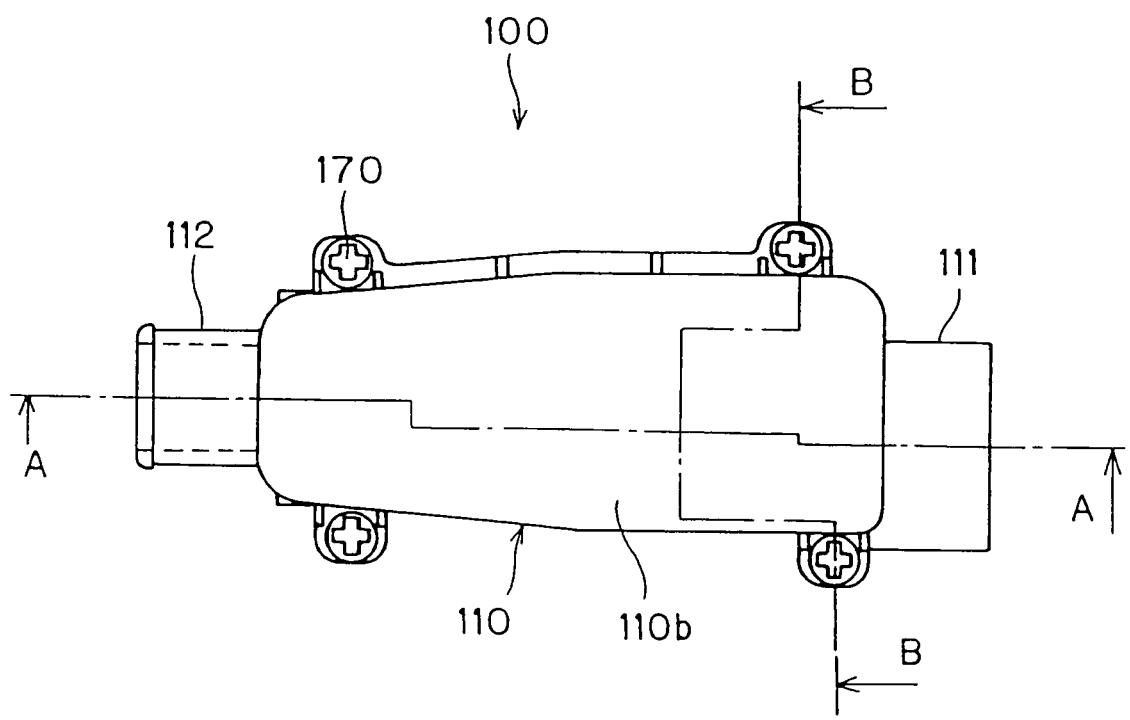
FIG. 4 is a top view of an ion elution unit.
Figure 5:
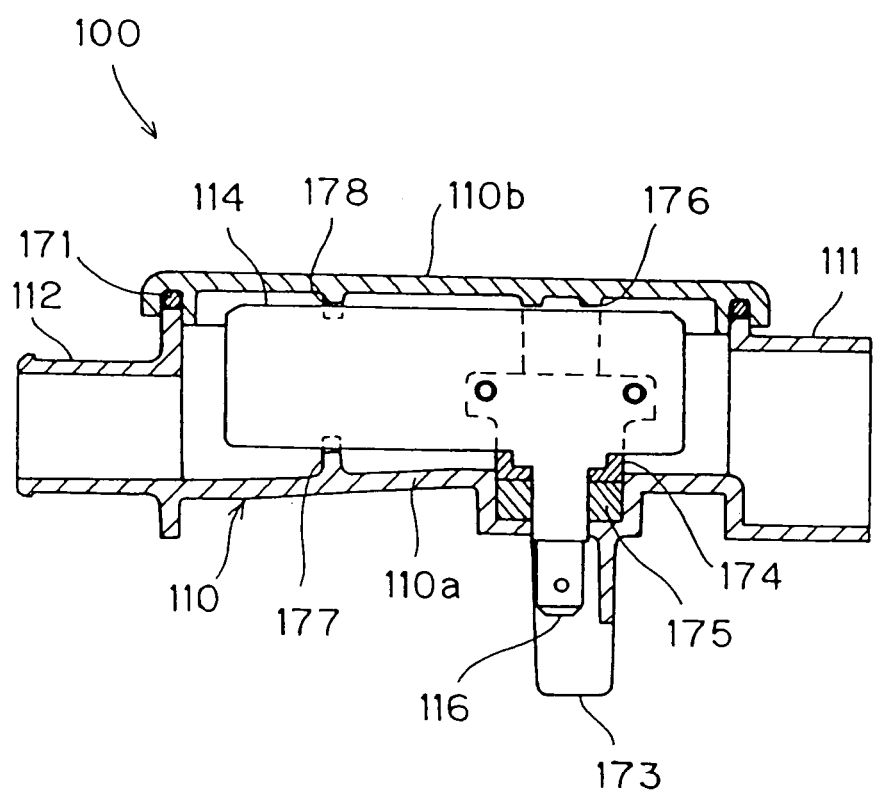
FIG. 5 is a vertical sectional view taken along line A-A shown in FIG. 4.
Figure 6:
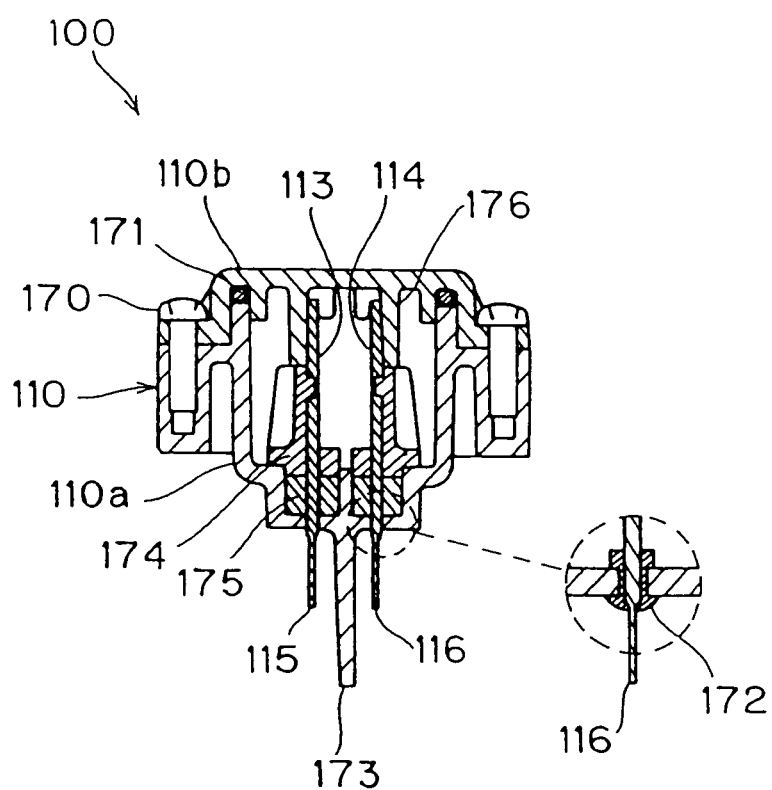
FIG. 6 is a vertical sectional view taken along line B-B shown in FIG. 4.
Figure 7:
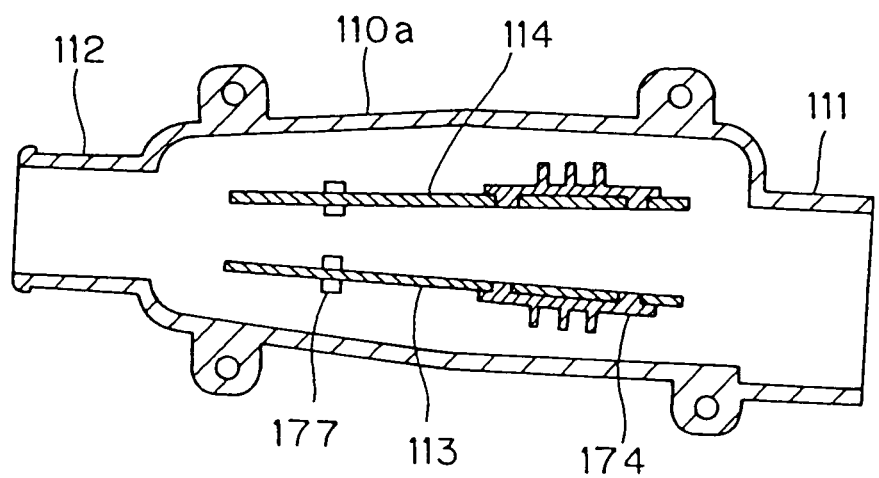
FIG. 7 is a horizontal sectional view of the ion elution unit.
Figure 8:
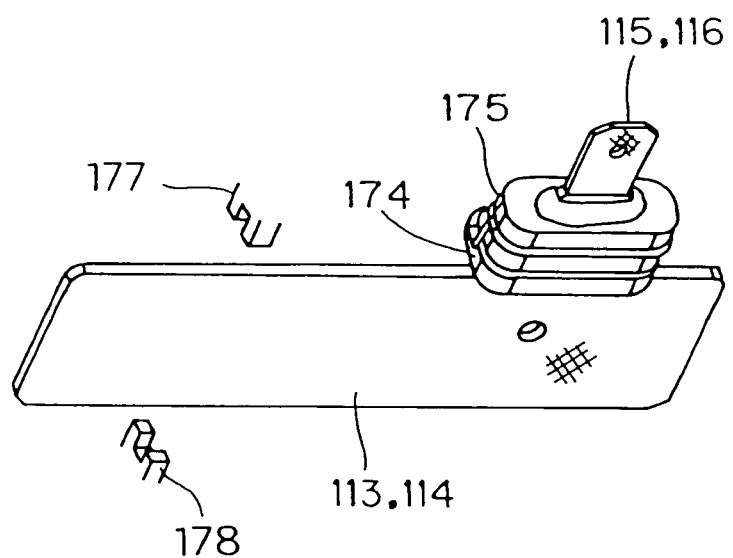
FIG. 8 is a perspective view of an electrode.

FIG. 4 through FIG. 8 shows the structure of the ion elution unit. FIG. 4 is a top view. FIG. 5 is a vertical sectional view taken along line A-A shown in FIG. 4. FIG. 6 is also a vertical sectional view taken along line B-B shown in FIG. 4. FIG. 7 is a horizontal sectional view. FIG. 8 is a perspective view of an electrode.

The ion elution unit 100 has a casing 110 formed of transparent or translucent, colorless or colored synthetic resin or opaque synthetic resin. The casing 110 is composed of a casing body 110a having an opening at the top and a lid 110b which closes the opening at the top. (See FIG. 5.) The casing 110a is shaped as long and narrow, containing a water inlet 111 at one end of the longitudinal direction and a water outlet 112 at the other end. The water inlet 111 and the water outlet 112 are pipe-shaped. Cross-sectional area of the water outlet 112 is smaller than that of the water inlet 111.

The casing 110 is arranged with its longitudinal direction being horizontal. The casing body 110a arranged horizontally in this way has a bottom which inclines gradually toward the water outlet 112. (See FIG. 5.) In other words, the water outlet 112 is located at the lowest level in an internal space of the casing 110.

The lid 110b is fixed to the casing body 110a with four screws 170. (See FIG. 4.) A seal ring 171 is inserted between the casing body 110a and the lid 110b. (See FIG. 5.)

Inside the casing 110, two plate electrodes 113 and 114 are arranged so as to be parallel to the water current flowing from the water inlet 111 toward the water outlet 112, facing each other. When a predetermined voltage is applied to the electrodes 113 and 114 with the casing 110 filled with water, metal ions of the metal of which the electrodes 113 and 114 are formed are eluted from whichever of them is at the anode side at the moment. For an example, the electrodes 113 and 114 may be so constructed that plates of silver each measuring 2 cm×5 cm and about 1 mm thick are arranged about 5 mm apart from each other.

Material of the electrodes 113 and 114 is not limited to silver. Any metal can be the material as long as it is a source for aitimicrobial metal ions. Other than silver, copper, an alloy of silver and copper, zinc or the like can be selected. Silver ions eluted from a silver electrode, copper ions eluted from a copper electrode and zinc ions eluted from a zinc electrode show an excellent sterilizing effect, even on mold. From an alloy of silver and copper, silver and copper ions can be eluted simultaneously.

As for the ion elution unit 100, it is possible to select either elution or non-elution by whether a voltage is applied or not. Moreover, an amount of elution of metal ions can be controlled by controlling electric current or the time for applying a voltage. Compared with a method of eluting metal ions from zeolite or other metal ion carriers, it is convenient because it is possible to electrically select whether the metal ions are added or not and to electrically adjust the concentration of the metal ions.

The electrodes 113 and 114 are not arranged completely in parallel. In the plane view, they are arranged to be tapered, having the space between them become narrower from the upstream toward the downstream along the water current flowing through the inside of the casing 110, in other words, from the water inlet 111 toward the water outlet 112. (See FIG. 7.)

The plan-view shape of the casing body 110a is also narrowed from one end having the water inlet 111 to the other end having the water outlet 112. Namely, the cross-sectional area in the internal space of the casing 110 gradually decreases from the upstream side toward the downstream side.

The electrodes 113 and 114 have both rectangular profile, and terminals 115 and 116 are provided thereto respectively. The terminals 115 and 116 are disposed at portions inside of the edges of the electrodes 113 and 114 on the upstream side, hanging down from the lower edge of the electrodes 113 and 114 respectively.

The electrode 113 and the terminal 115 are formed integrally from the same metal, and the electrode 114 and the terminal 116 are formed integrally from the same metal. The electrodes 115 and 116 are led to the bottom of the casing body 110a through a hole formed in a bottom wall of the casing body 110a. Where the terminals 115 and 116 protrude out of the casing 110a, as shown in an enlarged figure in FIG. 6, a watertight seal 172 is installed. The watertight seal 172 forms a double sealing construction together with a second sleeve 175 described later so as to prevent water from leaking from this portion.

At the bottom of the casing 110a, an insulating wall 173, which isolates the terminals 115 and 116, is integrally formed. (See FIG. 6.) The terminals 115 and 116 are connected to a drive circuit within the controller 80 by way of a cable (not shown).

Of the terminals 115 and 116, portions remaining in the casing 110 are protected by a sleeve made of insulation material. Two types of sleeves are used. One sleeve 174 is made of synthetic resin and engaged into the roots of the terminals 115 and 116. A part of the first sleeve 174 spreads to one side of the electrodes 113 and 114, forming projections on the side of these portions and fitting these projections to the through holes made in the electrodes 113 and 114. This helps prevent the electrodes 113 and 114 from coming out of the sleeve 174. The second sleeve 175 is made of soft rubber and fills the gap between the first sleeve 174 and the bottom wall of the casing body 110a, thus preventing water from leaking through the gap between the second sleeve 175 and the casing body 110a and through the gaps between the second sleeve 175 and the electrodes 113 and 114.

As mentioned above, the terminals 115 and 116 are located on the upstream side of the electrodes 113 and 114. The upstream sides of the electrodes 113 and 114 are supported by the first sleeve 174, which is engaged to the terminals 115 and 116. On the inner surface of the lid 110b, a support 176 in a shape of a fork is formed so as to fit to the position of the first sleeve 174. (See FIG. 6.) This support 176 catches the upper edge of the first sleeve 174 and becomes a rigid support, together with the second sleeve 175 filling the gap between the first sleeve 174 and the casing body 110a. The fork-shaped support 176 catches the electrodes 113 and 114 with long and short fingers, by which the electrodes 113 and 114 can maintain an appropriate space between each other on the side of the lid 110b.

The downstream sides of the electrodes 113 and 114 are also supported by the support formed on the inner surface of the casing 110. A fork-shaped support 177 rises from the bottom surface of the casing body 110a. Also, a fork-shaped support 178 hangs down from the ceiling of the lid 110b to face the support 177. (See FIGS. 5 and 8.) The electrodes 113, and 114 are caught by the supports 177 and 178 at the lower and upper edges on the downstream side respectively so as not to move.

As shown in FIG. 7, the electrodes 113 and 114 are so arranged that the surfaces opposite to the surfaces that are facing each other keep a space from the inner surface of the casing 110. Moreover, as shown in FIG. 5, the electrodes 113 and 114 are so arranged as to keep a space between their upper and lower edges and the inner surface of the casing 110. (Portions which are in contact with the supports 176, 177 and 178 are exceptions.) Additionally, as shown in either of FIG. 7 and FIG. 5, a space is made between the upstream and downstream side edges of the electrodes 113 and 114 and the inner surface of the casing 110.

When it is necessary to make the width of the casing 110 much smaller, it is possible to construct the electrodes 113 and 114 in such a manner that the surfaces opposite to the surfaces that are facing each other are attached firmly to the inner wall of the casing 110.

In order to prevent foreign objects from getting contact with the electrodes 113 and 114, a strainer of a metal mesh is mounted on the upstream side of the electrodes 113 and 114. As shown in FIG. 2, a strainer 180 is placed in the connection pipe 51. The strainer 180 is for the purpose of preventing foreign objects from intruding into the water feed valve 50, and it also serves as an upstream strainer of the ion elution unit 100.

A strainer of a metal mesh 181 is mounted to the downstream side of the electrodes 113 and 114. The strainer 181 prevents broken pieces of the electrodes 113 and 114 from flowing out when they are thinned out and broken due to being used for a long time. The water outlet 112 can be selected as a site for mounting the strainer 181, for example.

The locations of the strainers 180 and 181 are not limited to the above. As long as the conditions of mounting on "the upstream side of the electrode" and on "the downstream side of the electrode" are satisfied, they can be placed at any location in the water feed passage. The strainers 180 and 181 are removable so that foreign objects they catch can be removed or substances contributing to clogging can be cleared of.

Figure 9:
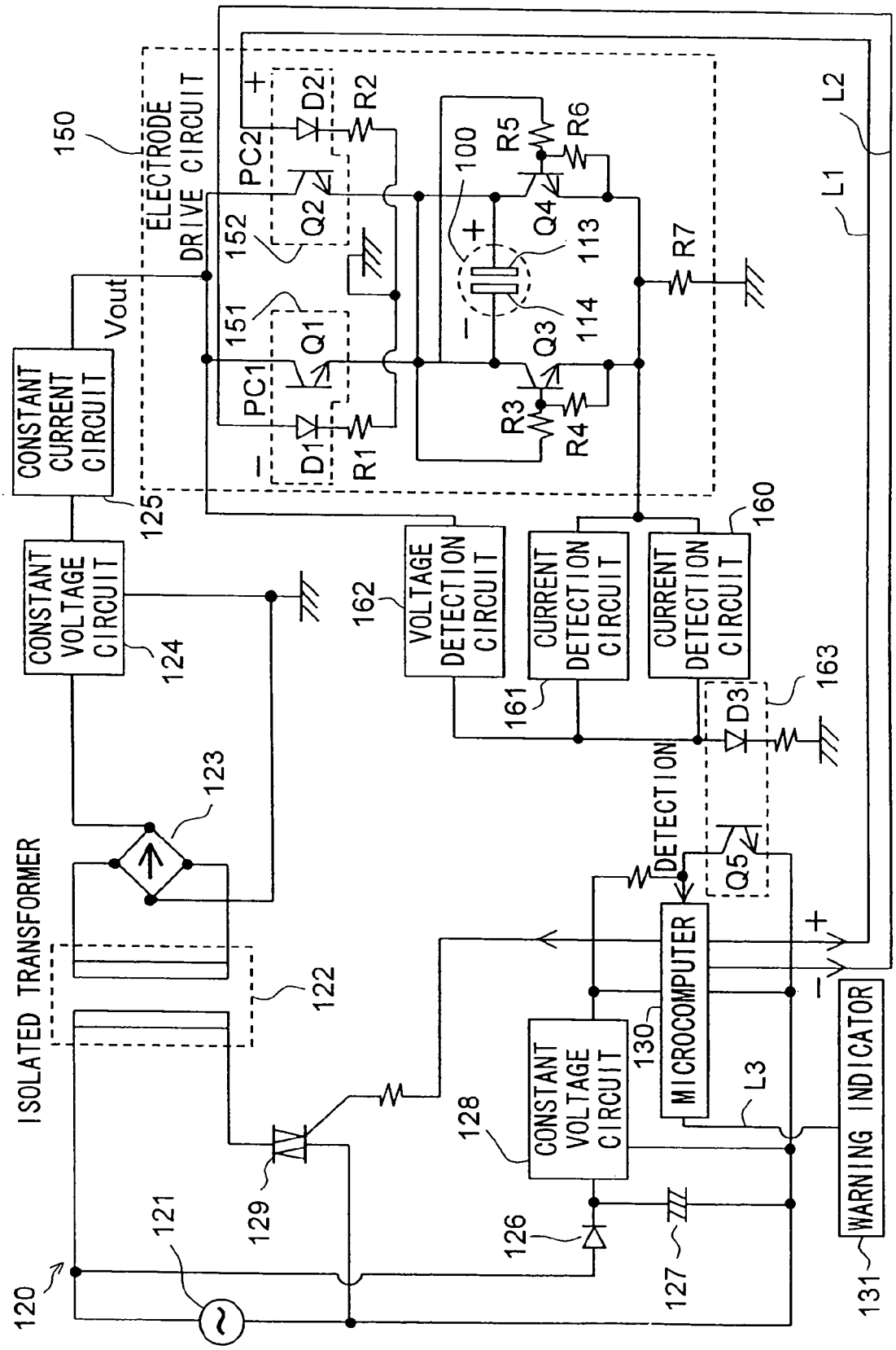
FIG. 9 is a drive circuit diagram of the ion elution unit.

FIG. 9 shows the drive circuit 120 for the ion elution unit 100. A transformer 122 is connected to commercially distributed electric power 121 so as to step down 100 V to a predetermined voltage. The output voltage of the transformer 122 is rectified by a full-wave rectifier circuit 123, and is then formed into a constant voltage by a constant voltage circuit 124. To the constant voltage circuit 124 is connected a constant current circuit 125. The constant current circuit 125 operates in such a way as to supply a constant current to the electrode drive circuit 150 described later without being influenced by variation in the resistance through the electrode drive circuit 150.

To the commercially distributed electric power 121 is also connected, in parallel with the transformer 122, a rectifying diode 126. The output voltage of the rectifying diode 126 is smoothed by a capacitor 127, is then formed into a constant voltage by a constant voltage circuit 128, and is then supplied to a microcomputer 130. The microcomputer 130 controls the starting of a triac 129 connected between one end of the primary coil of the transformer 122 and the commercially distributed electric power 121.

The electrode drive circuit 150 is composed of NPN-type transistors Q1 to Q4, diodes D1 and D2, and resistors R1 to R7. These are interconnected as shown in the figure. The transistor Q1 and the diode D1 form a photocoupler 151, and the transistor Q2 and the diode D2 form a photocoupler 152. The diodes D1 and D2 are photodiodes, and the transistors Q1 and Q2 are phototransistors.

The microcomputer 130 feeds a high-level voltage to a line L1 and a low-level voltage (or zero voltage, namely, "off") to a line L2. Then, the diode D2 turns on, and this causes the transistor Q2 to turn on. When the transistor Q2 turns on, a current flows through the resistors R3, R4, and R7, and this causes a bias to be applied to the base of the transistor Q3. Thus, the transistor Q3 turns on.

On the other hand, the diode D1 is off, and thus the transistors Q1 is off, and accordingly the transistor Q4 is off. In this state, a current flows from the anode-side electrode 113 to the cathode-side electrode 114. As a result, in the ion elution unit 100, there are produced metal ions as positively-charged ions together with negatively-charged ions.

When an electric current is passed through the ion elution unit 100 in one direction for a long time, the electrode 113, which is at the anode side in FIG. 9, wears off, while the electrode 114, which is at the cathode side, collects impurities in water in the form of scales deposited on it. This degrades the performance of the ion elution unit 100. In order to avoid this, the electrode drive circuit 150 can be operated in a compulsory electrode-cleaning mode.

On reversing the polarities of the electrodes, the microcomputer 130 switches modes of control so as to invert the voltage applied between the lines L1 and L2 and thereby reverse the current that flows between the electrodes 113 and 114. In this mode, the transistors Q1 and Q4 are on, and the transistors Q2 and Q3 are off. The microcomputer 130 has a counter capability, and switches modes of control as described above every time a predetermined count is reached.

When the resistance through the electrode drive circuit 150, in particular, the resistance of the electrodes 113 and 114, varies and as a result, for example, the current that flows between the electrodes decreases, the constant current circuit 125 raises its output voltage to compensate for the decrease. However, as the total time of use increases, the ion elution unit 100 eventually reaches the end of its service life. When this happens, even if the mode of control is switched to the forcible electrode cleaning mode, or if the output voltage of the constant current circuit 125 is raised, it is no longer possible to compensate for the decrease in the current.

In order to cope with this, in the circuit under discussion, the current that flows between the electrodes 113 and 114 of the ion elution unit 100 is monitored on the basis of the voltage that it produces across the resistor R7. When the current becomes equal to a predetermined minimum current, a current detection circuit 160 detects it. The fact that the minimum current has been detected is transmitted from a photodiode D3, which is a part of a photocoupler 163, through a phototransistor Q5 to the microcomputer 130. The microcomputer 130 then drives, by way of a line L3, a warning indicator 131 to make it indicate a predetermined warning. The warning indicator 131 is provided in the operation/display panel 81 or in the controller 80.

Moreover, in order to cope with a fault such as short-circuiting within the electrode drive circuit 150, there is provided a current detection circuit 161 that detects the current being larger than a predetermined maximum current. On the basis of the output of this current detection circuit 161, the microcomputer 130 drives the warning indicator 131. Furthermore, when the output voltage of the constant current circuit 125 becomes lower than a previously set minimum voltage, a voltage detection circuit 162 detects it, and the microcomputer 130 likewise drives the warning indicator 131.

The metal ions generated by the ion elution unit 100 are poured into the washing tub in the following manner.

Figure 14:
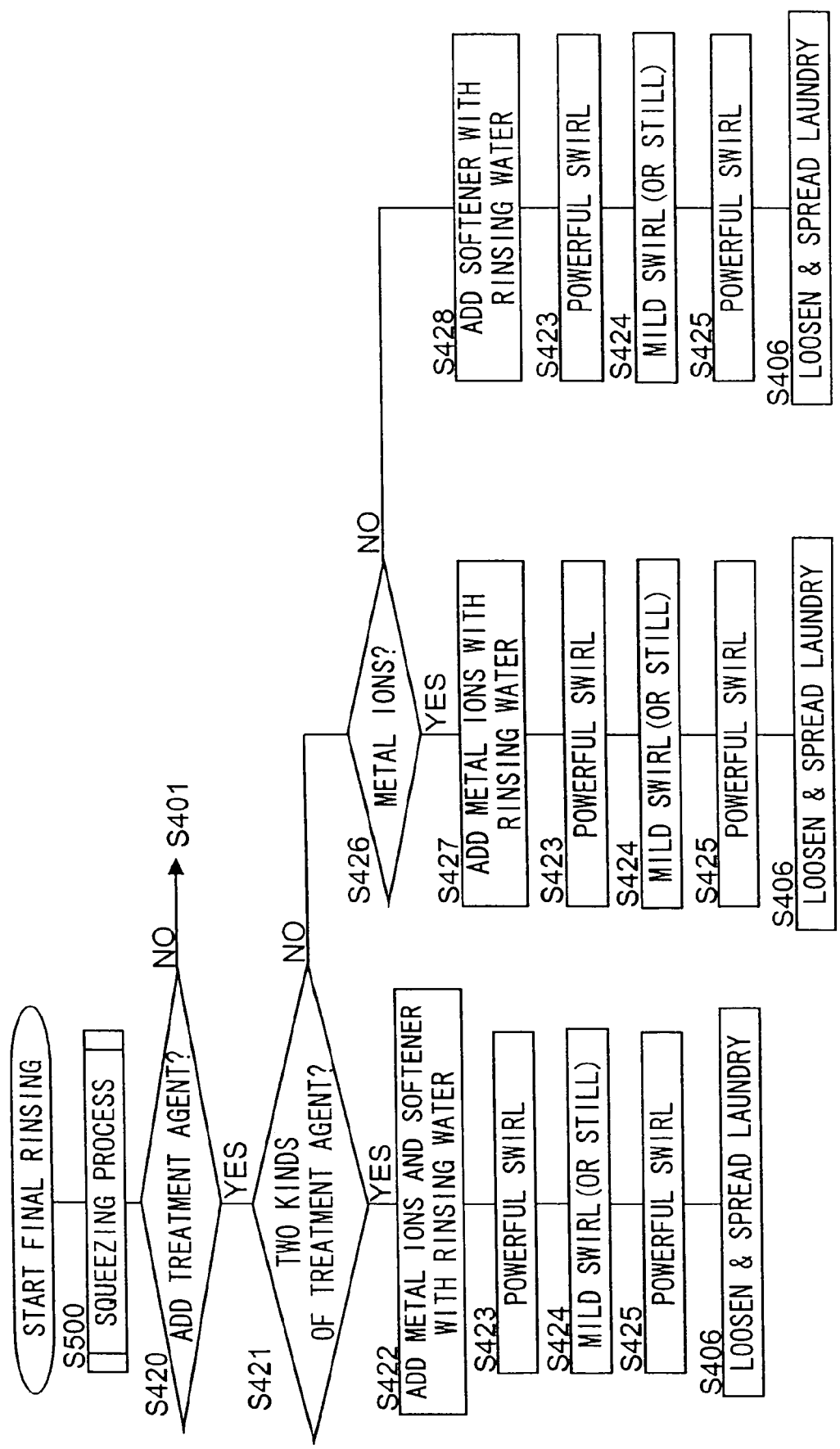
FIG. 14 is a flow chart of a final rinsing process.

Metal ions and a softening agent to be used as a treatment agent are added in the final rinsing process. FIG. 14 is a flow chart showing the sequence of the final rinsing. In the final rinsing process, after the squeezing process of step S500, the flow proceeds to step S420. In step 420, whether addition of the treatment material is selected or not is checked. When "addition of a treatment agent" is selected through a selection operation performed by way of the operation/display panel 81, the flow proceeds to step S421. If not, the flow proceeds to step S401 in FIG. 12, and the final rinsing is executed in the same manner as in the previous rinsing processes.

In step S421, whether the treatment materials to be added are two types, that is metal ions and a softening agent, or not, is checked. When "metal ions and a softening agent" is selected through a selection operation performed by way of the operation/display panel 81, the flow proceeds to step S422; if not, the flow proceeds to step S426.

In step S422, both of the main water feed valve 50a and the sub water feed valve 50b are opened, and water flows into both of the main water feed passage 52a and the sub water feed passage 52b.

Step S422 is a process for elution of metal ions. A predetermined amount of water, which is set to be more than the volume of water set for the sub water feed valve 50b, is flowing, filling the internal space of the ion elution unit 100. Simultaneously, the drive circuit 120 applies a voltage between the electrodes 113 and 114, so that ions of the metal of which they are formed are eluted into the water. When the metal forming the electrodes 113 and 114 is silver, reaction of $Ag \rightarrow Ag^+ + e^-$ occurs on the anode side and silver ions $Ag^+$ are eluted into the water. The electric current flowing between the electrodes 113 and 114 is direct current. Water to which the metal ions are added flows into the detergent chamber 54 and then is poured into the washing tub 30 from the water outlet 54a by way of the water outlet 56.

From the sub water feed valve 50b, smaller amount of water than that from the main water feed valve 50a flows out and is poured into the treatment agent chamber 55 by way of the sub water feed passage 52b. If a treatment agent (softening agent) has been supplied into the treatment agent chamber 55, the treatment agent (softening agent) is fed into the washing tub 30 through the siphon 57 together with water. This addition is performed simultaneously when the metal ions are added. The effect of a siphon does not occur until the water level inside the treatment agent chamber 55 reaches a predetermined level. This permits the liquid treatment agent (softening agent) to be held in the treatment agent chamber 55 until the time comes when water is poured into the treatment agent chamber 55.

When a predetermined amount of water (so much as or more than the amount to cause the effect of a siphon to occur in the siphon 57) is poured into the treatment agent chamber 55, the sub water feed valve 50b is closed. This step of feeding water, namely, adding a treatment agent, is performed automatically, irrespective of whether or not a treatment agent (softening agent) has been put into the treatment agent chamber 55 so long as "addition of a treatment agent" is selected.

When a predetermined amount of water containing metal ions has been poured into the washing tub 30, and the concentration of metal ions in the rinsing water is expected to be a predetermined level when water containing no metal ions is fed to the set water level, the application of a voltage between the electrodes 113 and 114 is stopped. After the ion elution unit 100 stops generation of metal ions, the main water feed valve 50a continues supplying water and stops water supply when the water level in the washing tub 30 reaches the set level.

As described above, in step S422, metal ions and a treatment agent (softening agent) are added simultaneously. However, this does not necessarily mean that the time during which a treatment agent (softening agent) is poured into the washing tub through an effect of a siphon completely overlaps the time while the ion elution unit 100 is generating metal ions. Either of the above time may be shifted to be earlier or later than the other. After the ion elution unit 100 stops generation of the metal ions and while water containing no metal ions is additionally fed, the treatment agent (softening agent) may be added. The point is that it is sufficient so long as the addition of metal ions and the addition of a treatment agent (softening agent) are eecuted respectively in one sequence.

As described before, the terminal 115 is formed to the electrode 113 integrally and the terminal 116 is formed to the electrode 114 integrally, from the same metal. Therefore, different from a case where different metals are connected, potential difference does not occur between the electrodes and terminals, thus preventing corrosion from occurring. Additionally, being formed integrally simplifies the manufacturing process.

The space between the electrodes 113 and 114 is set to be in a tapered manner, becoming narrower from the upstream side toward the downstream side. This makes the electrodes 113 and 114 be in line with the flow of water, and the electrodes 113 and 114 are more likely not generating vibration, thereby even when they wear off and are thinned, they hardly are chipped off. Moreover, there is no concern for excessive deformation of electrodes that might result in a short circuit.

The electrodes 113 and 114 are supported in a manner that a space is made between them and the inner surface of the casing 110. This helps prevent a metal layer from growing from the electrodes 113 and 114 to the inner surface of the casing 110 and causing a short circuit between electrodes.

Although the terminals 115 and 116 are formed integrally to the electrodes 113 and 114 respectively, the electrodes 113 and 114 are eventually depleted as a result of use. However, the terminals 115 and 116 should be kept from depletion. In an embodiment of the present, the portions of the terminals 115 and 116 located inside the casing 110 are protected by the sleeves 174 and 175 made of insulating material, and are guarded from depletion caused by electric conduction. This helps prevent such situation as the terminals 115 and 116 are broken in midway of their use.

In the electrodes 113 and 114, the portions where the terminals 115 and 116 are formed are rather deep inside from the edge on the upstream side. The electrodes 113 and 114 wear off, starting at a portion where the space between them has become narrow. In general, depletion occurs at the edge portion. Although the terminals 115 and 116 are located in the upstream side of the electrodes 113 and 114, they are not completely at the edges, but at rather deep inside portions from the edges. Therefore, it is not necessary to be worried about a situation that the depletion starting at the edge of an electrode reaches the terminal to cause a breakage of the terminal at its root.

The electrodes 113 and 114 are supported by the first sleeve 174 and the support 176 on their upstream sides. On the other hand, the downstream sides of the electrodes 113 and 114 are supported by the supports 177 and 178. Since they are supported rigidly on both upstream side and downstream side in this way, the electrodes 113 and 114 do not vibrate although they are in the water current. As a result, the electrodes 113 and 114 do not get broken due to vibration.

The terminals 115 and 116 go through the bottom wall of the casing body 110a to be protruded downward. Therefore, although the external surface of the casing 110 is subjected to dew concentration because steam gets contact with the casing 110a (When warm water in a bath tub is used for washing, steam is easy to intrude into the interior of the washer 1.) or because the casing 110 is cooled down by feeding of water, the water from dew condensation flows down the cables connected to the terminals 115 and 116 and does not stay on the border between the terminals 115 and 116 and the casing 110. Therefore, no situation is developed in which a short circuit occurs between the terminals 115 and 116 due to the water caused by dew condensation. The casing body 110a is arranged with the longitudinal direction on the horizontal line, it is easy to make it constructed in a manner that the terminals 115 and 116 formed on the sides of the electrodes 113 and 114 protrude downward through the bottom wall of the casing body 110a.

The cross-sectional area of the water outlet 112 of the ion elution unit 100 is smaller than that of the water inlet 111 and has larger resistance to the flow of water than the water inlet 111. This makes water entering the casing 110 through the water inlet 111 fill the interior of the casing 110 without causing stagnant air and soak the electrodes 113 and 114 completely. Therefore, such situation as the electrodes 113 and 114 have portions that are unrelated to the generation of metal ions but remain un-melted does not occur.

Not only the cross-sectional area of the water outlet 112 is smaller than that of the water inlet 111 but also the cross-sectional area of the inner space of the casing 110 is gradually decreasing from the upstream side toward the downstream side. This makes generation of turbulence or air bubble inside the casing 110 be reduced, thereby making water flow smoothly. Also, this prevents the electrodes partially not melted by the existence of air bubble. The metal ions come off the electrodes 113 and 114 quickly and do not go back to the electrodes 113 and 114, thus increasing the efficiency of ion elution.

The ion elution unit 100 is arranged in the main water feed passage 52a for a large volume of flow where a large amount of water flows. This permits the metal ions to be carried out of the casing 110 quickly and prevents them from going back to the electrodes 113 and 114, thus increasing the efficiency of ion elution.

The water outlet 112 is placed at the lowest level in the inner space of the casing 110. Therefore, when feeding of water to the ion elution unit 100 is stopped, all the water in the ion elution unit 100 flows out through the water outlet 112. In consequence, no such a case occurs as water remaining in the casing 110 is frozen when it is cold and the ion elution unit 100 fails or breaks.

A strainer 180 is placed on the upstream side of the electrodes 113 and 114. This makes it possible that although solid foreign object exists in water fed to the ion elution unit 100, the foreign object is caught by the strainer 180, which prevents it from reaching the electrodes 113 and 114. Consequently, a foreign object does not damage the electrodes 113 and 114, nor cause a short circuit between the electrodes to cause an excessive electric current or to lead to metal ion generation shortage.

A strainer 181 is placed on the downstream sides of the electrodes 113 and 114. If the electrodes 113 and 114 are depleted and become fragile due to a long-time use and get broken into pieces and the broken pieces flow, the strainer 181 catches these broken pieces so as to prevent them from flowing toward the downstream from that point. As a result, broken pieces of the electrodes 113 and 114 do not damage an object on the downstream side.

As the embodiment of the present invention, when a washer 1 is furnished with the ion elution unit 100, foreign objects or broken pieces of electrodes may be attached to laundry if there are no strainers 180 and 181. There is a possibility that foreign objects or broken pieces of electrodes may spoil or damage laundry, and if laundry where foreign objects or broken pieces of electrodes remain attached is subjected to squeezing and drying, a person who wears the laundry later may touch them and feel uncomfortable or in the worst case, he may get hurt. However, installation of the strainers 180 and 181 can avoid such a situation.

Both of the strainers 180 and 181 do not have to be placed. When it is determined that no installation of a strainer causes a problem, one or both of them can be abolished.

Back in FIG. 14, in step S423, the rinsing water to which the metal ions and the treatment agent (softening agent) are added is agitated by a powerful water flow (powerful swirl) and thus promotes contact of the laundry with the metal ions and attachment of the treatment agent (softening agent) to the laundry.

By thoroughly agitating by the powerful swirl, the metal ions and the treatment agent (softening agent) can be melted uniformly in water and spread to every corner of the laundry. After agitation by the powerful swirl for a predetermined time, the flow proceeds to step S424.

In step S424, the situation is completely changed. Agitation is executed by weak water flow (mild swirl). Its aimed purpose is to make the metal ions attached to the surface of laundry to exert their effect. As long as there is a water flow although it is mild, there is no possibility of users' misunderstanding that the operation of the washer 1 has been over. Therefore, agitation is executed mildly. However, if there is a method to make users realize that the rinsing process is still in progress, for example, by displaying an indication on the operation/display panel 81 to evocate the users' attention, it is permissible to stop agitation and place the water at a standstill.

After a period of mild swirl, which is set to be sufficient for laundry to absorb the metal ions, the flow proceeds to step S425. Here, agitation for ensuring is executed again with using a powerful water flow (powerful swirl). This helps distribute the metal ions to the portions of laundry where the metal ions have not been spread and make them attached firmly.

After step S425, the flow proceeds to step S406. In step S406, the pulsator 33 rotates repeatedly in the forward and then reverse directions at short time intervals. This permits the laundry to loosen, and thereby permits it to spread evenly in the washing tub 30. This is done in preparation for squeezing rotation.

Figure 15:
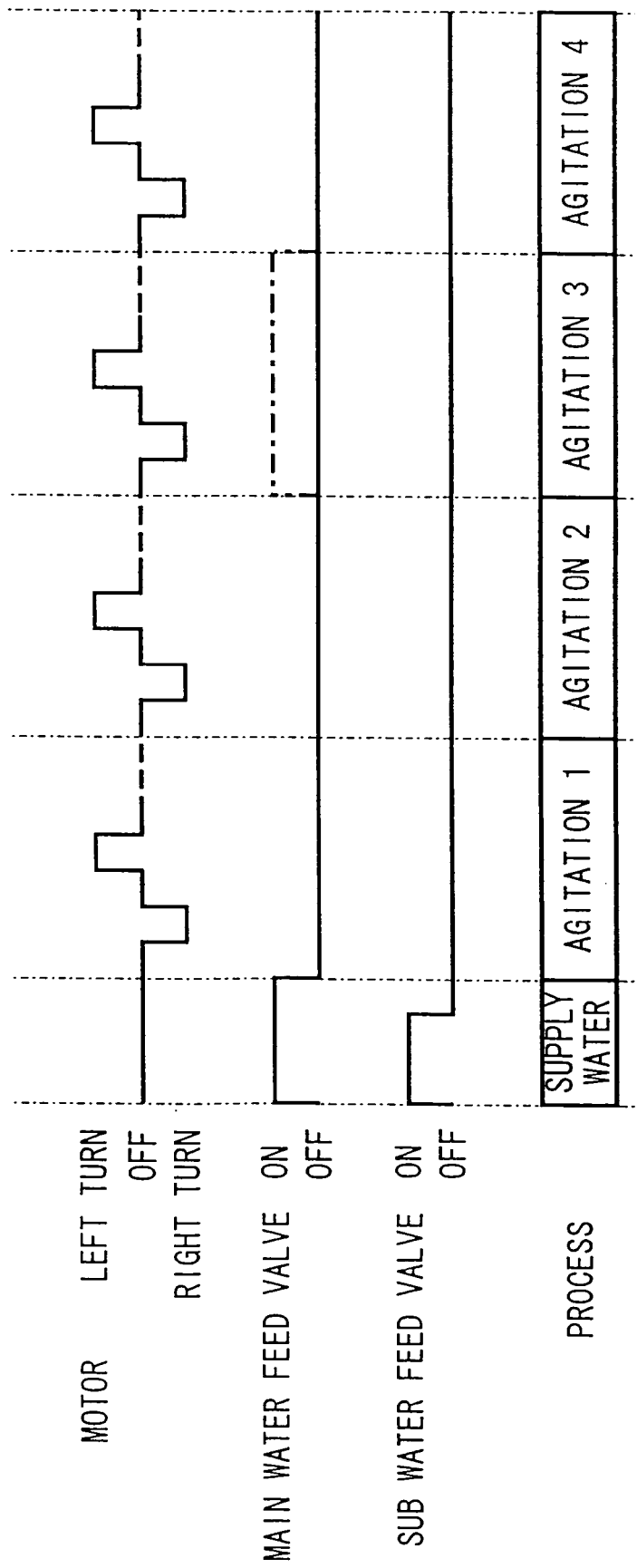
FIG. 15 is a sequence chart of a final rinsing process.

FIG. 15 is a sequence chart showing performance of each constituting element from step S422 to step S406.

An example is given to show the distribution of time for each step: four minutes for step S423 (powerful swirl); four minutes and fifteen seconds for step S424 (mild swirl), five seconds for step S425 (powerful swirl) and one minute and forty seconds for step S406 (even spreading of laundry). Total time from step S423 to step 406 is ten minutes. The mild swirl period may be replaced with a still period.

When "rinsing with pouring water" is selected, the time for step S425 (powerful swirl) is extended from five seconds to one minute, and as shown with a one-dot chain line, the main water feed valve 50a is opened to feed water. At this time, the time for step S406 (even spreading of the laundry) is forty-five seconds.

When a swirl is generated, the motor 41 repeats ON (turning in forward direction) OFF, ON (turning in reverse direction) and OFF cyclically. The ratio of ON time versus OFF time varies, depending on a volume of water and/or an amount of laundry. For example, the ratio of time (ON/OFF) during operation at the rated load is as follows: (unit is second)

| | |
|---|---|
| Step S423 (Powerful swirl): | 1.9/0.7 |
| Step S424 (Mild swirl): | 0.6/10.0 |
| Step 425 (Powerful swirl): | 1.4/1.0 |
| Step S406 (Even spreading of laundry): | 0.9/0.4 |

In case where metal ions are added in the final rinsing process, the total time of the process becomes longer, compared with a case where the metal ions are not added. Since the metal ions require a certain amount of time to be thoroughly attached to laundry, the above program is contrived. Thereby the metal ions can be attached sufficiently to the laundry and exert the expected sterilizing effect.

Distribution of the time for step S423 (powerful swirl) and the time for step S424 (mild swirl) may set to be constant despite the volume of water inside the washing tub 30 and/or the amount of laundry. This makes control programming easy.

Distribution of the time for step S423 (powerful swirl) and the time for step S424 (mild swirl) may vary in accordance with the volume of water inside the washing tub 30 and/or the amount of laundry. This makes it possible to set the ratio of the powerful swirl period versus the mild swirl period in accordance with the volume of water and the amount of laundry, thus alleviating damage to cloth and preventing unnecessary consumption of electric power.

Basically, it is preferable to add metal ions and a treatment agent (softening agent) separately. This is because when the metal ions come to contact with a component of the softening agent, they change into chemical compounds, thus losing the antimicrobial effect of the metal ions. However, quite an amount of metal ions remain in the rinsing water till the last of rinsing process. Also, the loss of the effect of the metal ions can be compensated to a certain degree by setting the concentration of the metal ions appropriately. Therefore, by adding the metal ions and the treating agent (softening agent) simultaneously, the rinsing time is shortened compared with the case that the metal ions and the treating agent (softening agent) are separately added for separate processes of rinsing, leading to the promotion of household efficiency, although the efficacy of addition of resistance to microbes is reduced slightly.

Although it is inevitable that the metal ions and the treatment agent (softening agent) meet in the washing tub 30, it is desirable to prevent them from getting in contact with each other until they enter the washing tub 30. In the embodiment of the present invention, metal ions are added to the washing tub 30 from the main water feed passage 52a through the detergent chamber 54. The treatment agent (softening agent) is added to the washing tub 30 from the treatment agent chamber 55. Since the passage for adding the metal ions to the rinsing water is thus separated from the passage for adding the treatment agent to the rinsing water, the metal ions and the treatment agent (softening agent) do not get in contact with each other until they meet in the washing tub 30. Consequently, the metal ions do not change into chemical components by getting contact with the treatment agent (softening agent) of high concentration and lose their antimicrobial effect.

In the description, the final rinsing is assumed to be performed with rinsing water stored in the washing tub 30. However, it is also possible to perform the final rinsing by water being poured, namely, in the manner of "rinsing with pouring water." In this case, the poured water contains metal ions.

In case of "rinsing with pouring water," metal ions is added to the pouring water, and thereby it is made possible to make a necessary amount of metal ions attached to the laundry without decreasing the concentration of the metal ions in the water during the rinsing with pouring water. When an emphasis is not put on the sterilizing effect, water containing no metal ions can be fed to restrain consumption of the electrodes 113 and 114.

Either of the addition of the metal ions, the first treatment substance, and the addition of a treatment agent (softening agent), the second treatment substance, is optional. It is possible not to carry out either of the additions or both of the additions. When both additions are not to be executed, the flow proceeds from step S420 to step S401, and this has already been described. From now on, addition of either of the two types of treatment substances will be described.

In step S421, when the treatment substance to be added is not both of the two types, the metal ions and the softening agent, it means that only one of them is selected for addition. In this case, the flow proceeds to step S426.

In step S426, whether the treatment substance to be added is metal ion or not is checked. When it is determined to be metal ions, the flow proceeds to step S427; if not, the flow proceeds to step S428.

In step S427, the main water feed valve 50a is opened and water flows into the main water feed passage 52a. The sub water feed valve 50b is not opened. When water flows through the ion elution unit 100, the drive circuit 120 applies a voltage between the electrodes 113 and 114, which elutes ions of the metal composing the electrodes into the water. When it is determined that a predetermined amount of water containing metal ions has been poured into the washing tub 30, and a predetermined concentration of metal ions in the rinsing water can be obtained by adding water containing no metal to a set water level, application of a voltage to the electrodes 113 and 114 is stopped. After the ion elution unit 100 stops generation of the metal ions, the main water feed valve 50a continues to feed water until the water level inside the washing tub 30 reaches the set level.

After step S427, the flow proceeds to step S423. After that, in the same manner as when the metal ions and the treatment agent (softening agent) are added simultaneously, the flow proceeds from S423 (powerful swirl) to step S424 (mild swirl) and then to step S425 (powerful swirl) and to step S406 (even spreading of laundry.) The mild swirl period can be replaced with a still period.

If, in step S426, the treatment substance to be added is not metal ions, then the treatment substance is treatment agent (softening agent). In this case, the flow proceeds to step 428.

In step 428, both the main water feed valve 50a and the sub water feed valve 50b are opened and water is fed to both of the main water feed passage 52a and the sub water feed passage 52b. However, the ion elution unit 100 is not operated and metal ions are not generated. After sufficient water for causing an effect of siphon is supplied to the treatment agent chamber 55 and the treatment agent (softening agent) is put into the washing tub 30 by way of the siphon 57, the sub water feed valve 50 b is closed.

After the sub water feed valve 50b is closed, the main water feed valve 50a continues to feed water and stops feeding when the water level inside the washing tub 30 reaches a set level.

After step S428, the flow proceeds to step S423. After that, in the same manner as when metal ions and treatment agent (softening agent) are added simultaneously, the flow proceeds from S423 (powerful whirl), to step S424 (mild swirl) and then to step S425 (powerful swirl) and to step S406 (even spreading of the laundry). The mild swirl period can be replaced with a still period.

In this way, even when only one type of treatment substances is added, each of the steps from the powerful whirl to the mild swirl and then to the powerful whirl is to be taken to ensure that the treatment substance is attached to the laundry. However, since it is not necessary to equal the step-time distribution for metal ions and that for treatment agent (softening agent), the step-time distribution is adjusted to fit the type of treatment substance.

In case of a treatment agent (softening agent), it does not take a long time to attach to the laundry, unlike the case of the metal ions. Therefore, it is possible that after step S428, only step S423 (powerful whirl) and step S406 (even spreading of laundry) are taken and step S423 (powerful whirl) can be finished within a short time such as two minutes, for example.

When laundry cannot be spread evenly in step S406, the washer 1 vibrates heavily during the subsequent squeezing process. Vibration resulted from uneven spreading of laundry is detected by physical detection means such as touch sensor, shock sensor, acceleration sensor and the like or by software analyzing the voltage versus current pattern of the motor 41.

When uneven spreading of laundry is detected, squeezing rotation of the washing tub 30 is stopped, and water is fed once again and agitated to recover the even spreading of laundry. This recovery of even spreading is called "rinsing for correcting uneven spreading of laundry."

Figure 16:
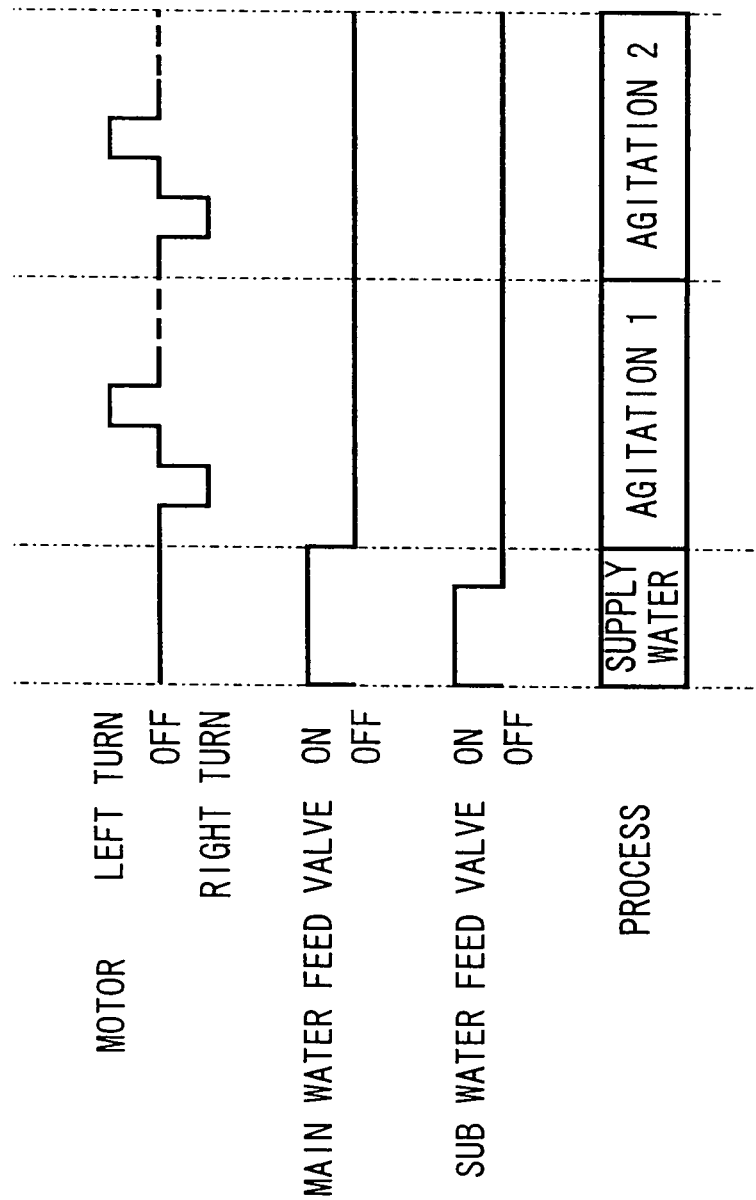
FIG. 16 is a sequence chart of a rinsing for correcting uneven distribution of laundry.

FIG. 16 is a sequence chart showing the performance of each element in the process of rinsing for correcting uneven spreading of laundry. After water supply is finished, water is agitated hard in agitation 1 period to change the arrangement of the laundry. After that, in agitation 2 period, agitation is executed little by little at short time intervals to spread the laundry evenly so as to prepare for re-start of squeezing rotation. The time distribution, for example, is 2 minutes and 5 seconds for supply of water, one minute for agitation 1 and 30 seconds for agitation 2.

During agitation, the motor 41 repeats ON (turning in forward direction), OFF, ON (turning in reverse direction) and OFF cyclically. The ratio of ON time versus OFF time differs, depending on volume of water and/or amount of laundry. For example, the ratio of time (ON/OFF) during operation at a rated load is as follows (unit is second).

| Agitation 1: | 1.9/0.7 |
| Agitation 2: | 0.9/0.4 |

In the final rinsing process, when uneven spreading of laundry is detected during the squeezing process after metal ions are added, countermeasures to be adapted are different from when no metal ions are added and uneven spreading of laundry is detected.

The first "different countermeasure" is "to feed water containing metal ions to carry out rinsing for correcting uneven spreading of laundry." In this way, in case where rinsing is performed for correcting uneven spreading of laundry with flesh water being fed, since the metal ions are added to the water, the effect of antimicrobial treatment on the laundry does not fade away.

When rinsing is performed for correcting uneven spreading of laundry with water containing metal ions being fed, it is preferable that the amount metal ions to be added is smaller than that in the preceding processes. In this way, it is not necessary to replenish an unnecessarily large amount of metal ions to the laundry, which has once been treated with the metal ions, and thus it is possible to restrain the consumption of metal ions.

The second "different countermeasure" is "to feed water containing no metal ions and agitate it to perform rinsing for correcting uneven spreading of laundry, with indication and/or notification that water being poured contains no metal ions."

When water containing metal ions is used while uneven spreading of laundry is being corrected, the metal of the electrodes 113 and 114 is consumed faster than its deigned service life, and the time when metal ions are not available comes earlier. However, in the above manner, when rinsing is performed for correcting uneven spreading of laundry by using water containing no metal ions, in order to restrain the consumption of the metal ions, the fact is indicated and/or notified to users by means of display on the operation/display panel 81 or voice message, and users can know that the expected antimicrobial effect may not be achieved.

The third "different countermeasure" is "to stop the squeezing rotation with the fact that uneven spreading of laundry is detected being indicated and/or notified."

In this way, it is possible to obtain the antimicrobial effect that users expect, at the same time the consumption of the metal ions is restrained, by not performing rinsing for correcting uneven spreading of laundry and notifying users that uneven spreading of laundry has occurred and letting them manually correct the unbalance When detection of uneven spreading of laundry is not a single occasion, different countermeasures are adapted for each occasion.

If the rinsing is performed for correcting uneven spreading of laundry by using water containing metal ions every time uneven spreading of laundry is detected, the metal which is the source of the metal ions, namely the electrodes 113 and 114, is consumed in a short time. However, with this configuration, by adapting a countermeasure to correct uneven spreading of laundry without using water containing metal ions, it is possible to restrain the depletion of the electrodes 113 and 114.

For alternatives of operation of the washer 1, it is possible that a plurality of kinds of countermeasures after detecting uneven spreading of laundry are provided and the kinds and/or execution order of countermeasures are selectable.

In this way, it is possible for users to determine the countermeasures of their wish. Namely, users can give priority to keeping the antimicrobial effect high by using abundant metal ions, or to saving metal ions.

Being used for metal ion elution, the electrodes 113 and 114 are gradually depleted, resulting in drop in metal ion elution rate. When they are used for a long time, the metal ion elution rate becomes unstable and the predetermined metal ion elution rate is not obtained. Therefore, the ion elution unit 100 is made replaceable, and when the duration of electrodes 113 and 114 expires, it can be replaced with a new unit. Moreover, users are notified, through the operation/display panel 81, the fact that the duration of electrodes 113 and 114 almost expires and therefore appropriate countermeasures, for example, replacement of the ion elution unit 100, should be adapted.

In order to operate the ion elution unit 100, constant current circuit 125 of the drive circuit 120 controls the voltage, so that the current flowing between the electrodes 113 and 114 is constant. By this, the amount of eluted metal ions per unit time becomes constant. When the amount of eluted metal ions per unit time is constant, it is possible to control the concentration of metal ions in the washing tub 30 by controlling the volume of water flowing through the ion elution unit 100 and the time of metal ion elution, thereby the expected concentration of metal ions is easily achieved.

On either one of the electrodes 113 and 114, if it acts as a cathode, scale is deposited. When direct current continues to flow without reversing the polarity and, as a result, the amount of scale deposit become larger, the current is subjected to be restricted, and the metal ion elution does not proceed at the predetermined rate. Moreover, a phenomenon of "one-sided depletion," in which only one electrode being used as an anode is consumed at a rate faster than the other. Therefore, the polarity of the electrodes 113 and 114 is reversed cyclically.

The current flowing between the electrodes 113 and 114 is direct current. At the moment of polarity reversal, the following phenomenon occurs. Namely, when the metal ions are silver ions, for example, the silver ions that have once been eluted go back to the electrodes by reverse reaction, i.e. $Ag^+ + e^- \rightarrow Ag$, when the polarities of the electrodes are reversed. To solve this problem, the following innovation is used in reversing the polarities of the electrodes 113 and 114.

FIG. 17 is a sequence chart illustrating the relation between the operations of each component and the operation of polarity reversal of electrodes in the ion elution process. If "addition of metal ions" is selected in the final rinsing process, it means that the final rinsing process is an ion elution process.

In FIG. 17, the main water feed valve 50a and the sub water feed valve 50b are, in the first place, turned on (opened), at the same time, the transformer 122 in the drive circuit 120 is also turned on. A voltage has not yet been applied between an electrode A (one of the electrodes 113 and 114) and an electrode B (the other of the electrodes 113 and 114).

At first, check of operation of the current detection circuits 160 and 161 is carried out. This can eliminate the possibility of erroneous detection by the current detection circuits 160 and 161 and prevent the metal ions from being eluted at an improper concentration.

After check of operation of the current detection circuits 160 and 161 is carried out during a current detection circuits' operation checking period T1, current starts flowing through the electrodes A and B. The electrode A is in the first place applied voltage, while the electrode B is at ground voltage. At this point, the electrode A is an anode and the electrode B is a cathode.

After a voltage application period T2 passes, application of a voltage to the electrode A is stopped. After a voltage application halt period T3 placed in-between, voltage application to the electrode B is started. The electrode A remains at ground voltage. This time, the electrode B is an anode and the electrode A is a cathode, that is, the polarities of the electrodes are reversed.

After the voltage application period T2 passes once again, voltage application to the electrode B is stopped. After a voltage application halt period T3 placed in-between, the polarities of the electrodes are reversed once again.

In this way, the voltage application period T2 and the voltage application halt period T3 are repeated alternately and the polarities of the electrodes 113 and 114 are reversed cyclically. The polarity reversal is continued until an expected amount of metal ions is eluted. The total of the voltage application period T2 and the voltage application halt period T3 is defined as an "ion elution period" T4.

As the result of repeated studies by the inventors to effectively control ion elution, the optimal figures to obtain an increase in ion elution efficiency and an even depletion of the electrodes are confirmed as 19.9 seconds for the voltage application period T2 and 0.1 second for the voltage application halt period T3. The preferable voltage and current are approximately 10V and 29 mA.

Scale or other substances precipitated during a cathode period are eluted during anode period. Therefore, accumulation of scale or other substances on the surface of electrode is prevented, and stable elution of metal ions is ensured. In addition, during the voltage application halt period between polarity reversal, the metal ions eluted from an electrode that was then an anode, can go far from the electrode with the flow of water. Thus, the metal ions do not return to the electrode where they have been eluted from even when the electrode is inverted to a cathode. As a result, electric power consumed in metal ion elution will not be wasted.

Due to the existence of the voltage application halt period T3, metal ions are evenly dispersed in water, causing the antimicrobial effect of the metal ions be exerted evenly over laundry.

The constant current circuit 125 changes the voltage applied so that the constant current flows between the electrodes 113 and 114. As the amount of eluted metal ions is proportional to the current that flows between the electrodes in a unit time, with fixation of current value, metal ion elution can be stabilized, and the amount of eluted metal ions can be easily calculated.

Voltage application between the electrodes 113 and 114 is started after feeding of water to the ion elution unit 100 is started. This allows metal ions to be certainly eluted at and after starting of voltage application between the electrodes, thus, the expected total amount of metal ions can surely be supplied to the laundry.

The current detection circuits 160 and 161 start detection operation when a predetermined period of time passes after the application of a voltage to the electrodes 113 and 114 is started. The current flowing thorough the electrodes 113 and 114 continue to be monitored until the detection operation ion elution period T4 is completed. The drive circuit 120 is controlled based on the detection data obtained by the current detection circuits 160 and 161.

As stated above, the current detection circuits 160 and 161 do not conduct the detection operation when current is not stable soon after supply of voltage to the electrodes 113 and 114 is started, but conduct the detection operation after current becomes stable, thereby more accurate detection is achieved.

When the current detection circuits 160 and 161 detect that current flowing through the electrodes exceeds a predetermined limit and enters an abnormal region, the warning indicator 131 notifies it to users. With this, users can be aware that the ion elution unit 100 can not secure the expected amount of eluted metal ions due to the abnormal current and the expected antimicrobial treatment is not likely to be done on the laundry, and that the ion elution unit 100 needs to be adjusted or repaired.

When the current detection circuits 160 and 161 detect abnormal current, specified countermeasures can be adapted. The specified countermeasures are, for example, a temporary stop of the washer 1, continuation of the washer operation with an indication or notification by notification means such as buzzers or lamps, and continuation of the washer 1 accompanied with disablement of the next operation informing users of the fact. These can avoid the situation that the washer 1 continues to operate as usual lacking in the function of the antimicrobial treatment to the laundry which is expected to be produced by the ion elution unit 100.

If the above "specified countermeasure" is "a temporary stop of the washer operation," it can surely be avoided that users continue the use of the washer 1 without noticing that the ion elution unit lacks the expected function of treating laundry with antimicrobial treatment.

The following operation is also possible. That is, even if the current detection circuits 160 and 161 detect abnormal current, the warning indicator 131 does not notify users of the abnormality on condition that normal current has been detected at least once during an ion elution process. By this, the washer 1 can continue operations and finish the laundry washing session when temporal abnormality, due to noise for example, is mistakenly detected The following operation is also possible. That is, when the current detection circuits 160 and 161 detect that the value of the current flowing between the electrodes 113 and 114 is a predetermined level or under, the lengths of the voltage application period and/or the voltage application halt period or the ion elution period are adjusted. With this configuration, even when the current is too low to obtain the expected amount of metal ion elution, in other words, when it is difficult to elute metal ions, the shortage of metal ions can be compensated by adjusting the lengths of the voltage application period and/or the voltage application halt period or the ion elution period, and thereby the laundry can be treated with antimicrobial treatment using expected total amount of metal ions.

The ion elution unit 100 can be operated in the following manner.

First, the ion elution period T4 is adjusted according to the amount of water used in the washer 1, in other words, water level in the washing tub 30.

As the ion elution period T4 is adjusted according to the amount of water used, water with constant metal ion concentration is supplied to the laundry. By this, it is avoided that water with excessive metal ion concentration makes the laundry be smeared, or, water with insufficient metal ion concentration fails to exert antimicrobial effect on the laundry. Furthermore, the lengths of the voltage application period T2 and/or the voltage application halt period T3 concerning the electrodes 113 and 114 are adjusted according to the amount of water used and/or the length of ion elution period T4.

By this, the variation in the amount of metal ions eluted from electrodes 113 and 114 due to the variation in the amount of water used or the length of ion elution period T4 can be compensated by adjusting at least one of the voltage application period T2 and the voltage application halt period T3. Consequently, the electrodes 113 and 114 are depleted evenly. Furthermore, neither of electrodes 113 and 114 is used with its polarity fixed for a long time, and the electrode used as a cathode for a long time accumulates large amount of scale on its surface only to hinder elution of metal ions when it is inverted to an anode. Therefore, the washer 1 maintains its ability to treat laundry with antimicrobial treatment stable for a long period.

And the lengths of the voltage application period T2 and/or the voltage application halt period T3 concerning the electrodes 113 and 114 or the ion elution period T4 are adjusted based on the measurement by the flow rate detection means 185.

When the washer 1 is connected to a faucet to use water, the volume of water flow in the ion elution unit 100 is not constant due to the variations in water pressure or conduit resistance in each house, even if, on the side of the washer 1, the water feed valve 50 keeps constant degree of opening. If it is so constructed that the above-mentioned adjustment is performed based on the measurement by the flow rate detection means 185, the amount of metal ions being eluted is adjusted according to the water flow rate, water is supplied with metal ions evenly dispersed in it, and the antimicrobial effect of the metal ions is evenly exerted on the laundry. Therefore, the washer 1 can minimize the agitation process to distribute metal ions to all portions of laundry.

When the current detection circuit 160 detects that the value of the current flowing between the electrodes 113 and 114 is a predetermined level or under, the volume of water flow fed to the ion elution unit 100 is reduced and the ion elution period is extended.

By this, even when the current is too low to obtain the expected amount of metal ion elution, in other words, when it is difficult to elute metal ions, the elution of expected amount of metal ions is achieved by the time when water-feeding is finished by the extension of water-feeding time derived from the reduction of the volume of water flow, and by the extension of the ion elution period. Therefore, the laundry is always stably treated with antimicrobial treatment.

It is to be understood that the present invention may be carried out in any other manner than specifically described above as an embodiment, and many modifications and variations are possible within the scope of the invention.

It is also to be understood that the present invention is applicable to all types of washers; not only those of fully automatic type, taken up in the embodiment described above, but also those having horizontal drums (of the tumbler type), those having slanted drums, those which function also as dryers, and those with two separated tubs.

The ion elution unit of the present invention may be arranged to be placed at the water feeding passage of the household electric appliances (dish washers, water purifiers, etc.) other than a laundry washing machine which use water, in combination with the above-mentioned embodiment appropriately. It may also be arranged to be standalone and soaked in the water in a container. As setting of the ion elution unit is easy without any need of special techniques in operating the ion elution unit, moreover, various kinds of goods to be washed can be effectively treated with antimicrobial treatment with a small amount of water, users can appreciate convenience. Furthermore, users can operate the ion elution unit correctly without being forced to adjust it, the antimicrobial treatment using can be utilized not only in laundry washing but also in wide range of appliances. Therefore, in many places, the proliferation of microbes or mold and generation of offensive smell can be prevented.

INDUSTRIAL APPLICABILITY

The present invention finds wide application in situations where exploitation of the antimicrobial effect of metal ions is attempted. An ion elution unit according to the present invention can be effectively combined not only with a washer but also with a dish washer, a humidifier, or any other type of appliance where growth of bacteria and mold needs to be suppressed.

The invention claimed is:

1. An ion elution unit that generates metal ions from electrodes when a drive circuit applies a voltage between the electrodes, the ion elution unit comprising:
 a water feed valve for feeding water to the ion elution unit; and
 a control unit configured to control the drive circuit when the water feed valve is feeding water to the ion elution unit to firstly apply the voltage between the electrodes by applying a positive voltage potential to a first electrode during a first adjustable voltage application period to cause the first electrode to act as an anode relative to a second electrode acting as a cathode so that the first electrode will provide the metal ions during the first adjustable voltage activating period, to secondly apply no voltage difference between the first and second electrodes during an adjustable voltage application halt period, and thirdly to apply the positive voltage to the second electrode during a second adjustable voltage application period to cause the second electrode to act as the anode relative to the first electrode acting as the cathode so that the second electrode will provide the metal ions during the second voltage activating period, the control unit being further configured to adjust at least one of the length of the first adjustable voltage application period, the length of the adjustable voltage application halt period, the length of the second adjustable voltage application period, and the length of an overall ion elution period that includes at least the first adjustable voltage application period, the adjustable voltage application halt period, and the second adjustable voltage application period to adjust the amount of eluted metal ions being produced to a desired level, wherein the electrodes are disposed along water current fed, wherein metal ion eluted from the electrodes are either silver ions, copper ions, or zinc ions, and wherein the control unit is further configured to control the drive circuit to adjust the voltage applied to the electrodes during at least one of the first adjustable voltage application period and the second adjustable voltage application period such that a constant current flow between the electrodes can be maintained.

2. An ion elution unit that generates metal ions from electrodes when a drive circuit applies a voltage between the electrodes, the ion elution unit comprising:

a water feed valve for feeding water to the ion elution unit; and a control unit configured to control the drive circuit when the water feed valve is feeding water to the ion elution unit to firstly apply the voltage between the electrodes by applying a positive voltage potential to a first electrode during a first adjustable voltage application period to cause the first electrode to act as an anode relative to a second electrode acting as a cathode so that the first electrode will provide the metal ions during the first adjustable voltage activating period, to secondly apply no voltage difference between the first and second electrodes during an adjustable voltage application halt period, and thirdly to apply the positive voltage to the second electrode during a second adjustable voltage application period to cause the second electrode to act as the anode relative to the first electrode acting as the cathode so that the second electrode will provide the metal ions during the second voltage activating period, the control unit being further configured to adjust at least one of the length of the first adjustable voltage application period, the length of the adjustable voltage application halt period, the length of the second adjustable voltage application period, and the length of an overall ion elution period that includes at least the first adjustable voltage application period, the adjustable voltage application halt period, and the second adjustable voltage application period to adjust the amount of eluted metal ions being produced to a desired level, wherein the electrodes are disposed along water current fed, and wherein metal ion eluted from the electrodes are either silver ions, copper ions, or zinc ions, the ion elution unit further comprising:

a current detection unit for detecting current flowing between the electrodes, wherein the control unit is further configured to control the drive circuit based on the current flowing between the electrodes detected by the current detection unit and to check operation of the current detection unit before the drive circuit is controlled by the control unit to apply any voltage to the electrodes.

3. An appliance that incorporates the ion elution unit as set forth in claim 2, wherein when the current detection unit detects abnormal current, the control unit executes specified countermeasures.

4. The appliance according to claim 3, wherein the specified countermeasure is a temporary stop of the appliance operation.

5. An appliance that incorporates the ion elution unit as set forth in claim 2, wherein, when the current detection unit detects that the current flowing between the electrodes is equal to or less than a predetermined level, the control unit controls the water feed valve to make the water feed valve reduce the volume of water flow fed to the ion elution unit and controls the drive circuit to make the drive circuit extend the overall ion elution period.

6. The appliance according to claim 3, wherein the appliance is a washer.

7. The appliance according to claim 4, wherein the appliance is a washer.

8. The appliance according to claim 5, wherein the appliance is a washer.

9. An ion elution unit that generates metal ions from electrodes when a drive circuit applies a voltage between the electrodes, the ion elution unit comprising:

a water feed valve for feeding water to the ion elution unit; and a control unit configured to control the drive circuit when the water feed valve is feeding water to the ion elution unit to firstly apply the voltage between the electrodes by applying a positive voltage potential to a first electrode during a first adjustable voltage application period to cause the first electrode to act as an anode relative to a second electrode acting as a cathode so that the first electrode will provide the metal ions during the first adjustable voltage activating period, to secondly apply no voltage difference between the first and second electrodes during an adjustable voltage application halt period, and thirdly to apply the positive voltage to the second electrode during a second adjustable voltage application period to cause the second electrode to act as the anode relative to the first electrode acting as the cathode so that the second electrode will provide the metal ions during the second voltage activating period, the control unit being further configured to adjust at least one of the length of the first adjustable voltage application period, the length of the adjustable voltage application halt period, the length of the second adjustable voltage application period, and the length of an overall ion elution period that includes at least the first adjustable voltage application period, the adjustable voltage application halt period, and the second adjustable voltage application period to adjust the amount of eluted metal ions being produced to a desired level, wherein the electrodes are disposed along water current fed, and wherein metal ion eluted from the electrodes are either silver ions, copper ions, or zinc ions, the ion elution unit further comprising:

a current detection unit for detecting current flowing between the electrodes, wherein the control unit is further configured to control the drive circuit based on the current flowing between the electrodes detected by the current detection unit and to check detection operation of the current detection unit a predetermined period of time after the drive circuit is controlled by the control unit to apply any voltage to the electrodes.

10. An ion elution unit that generates metal ions from electrodes when a drive circuit applies a voltage between the electrodes, the ion elution unit comprising:

a water feed valve for feeding water to the ion elution unit; and a control unit configured to control the drive circuit when the water feed valve is feeding water to the ion elution unit to firstly apply the voltage between the electrodes by applying a positive voltage potential to a first electrode during a first adjustable voltage application period to cause the first electrode to act as an anode relative to a second electrode acting as a cathode so that the first electrode will provide the metal ions during the first adjustable voltage activating period, to secondly apply no voltage difference between the first and second electrodes during an adjustable voltage application halt period, and thirdly to apply the positive voltage to the second electrode during a second adjustable voltage application period to cause the second electrode to act as the anode relative to the first electrode acting as the cathode so that the second electrode will provide the metal ions during the second voltage activating period, the control unit being further configured to adjust at least one of the length of the first adjustable voltage application period, the length of the adjustable voltage application halt period, the length of the second adjustable voltage application period, and the length of an overall ion elution period that includes at least the first adjustable voltage application period, the adjustable voltage application halt period, and the second adjustable voltage application period to adjust the amount of eluted metal ions being produced to a desired level, wherein the electrodes are disposed along water current fed, and wherein metal ion eluted from the electrodes are either silver ions, copper ions, or zinc ions, the ion elution unit further comprising:

a current detection unit for detecting current flowing between the electrodes; and a warning indicator, wherein the control unit is further configured to control the drive circuit based on the current flowing between the electrodes detected by the current detection unit, and, when the current detection unit detects abnormal current, the control unit is further configured to control the warning indicator to issue a warning to notify a user of abnormality.

11. The ion elution unit according to claim 10, wherein even if the current detection unit detects abnormal current, so long as normal current has been detected at least once during an ion elution process, the control unit does not give the warning indicator an instruction that makes the warning indicator issue the warning to notify the user of the abnormality.

12. An ion elution unit that generates metal ions from electrodes when a drive circuit applies a voltage between the electrodes, the ion elution unit comprising:

a water feed valve for feeding water to the ion elution unit; and a control unit configured to control the drive circuit when the water feed valve is feeding water to the ion elution unit to firstly apply the voltage between the electrodes by applying a positive voltage potential to a first electrode during a first adjustable voltage application period to cause the first electrode to act as an anode relative to a second electrode acting as a cathode so that the first electrode will provide the metal ions during the first adjustable voltage activating period, to secondly apply no voltage difference between the first and second electrodes during an adjustable voltage application halt period, and thirdly to apply the positive voltage to the second electrode during a second adjustable voltage application period to cause the second electrode to act as the anode relative to the first electrode acting as the cathode so that the second electrode will provide the metal ions during the second voltage activating period, the control unit being further configured to adjust at least one of the length of the first adjustable voltage application period, the length of the adjustable voltage application halt period, the length of the second adjustable voltage application period, and the length of an overall ion elution period that includes at least the first adjustable voltage application period, the adjustable voltage application halt period, and the second adjustable voltage application period to adjust the amount of eluted metal ions being produced to a desired level, wherein the electrodes are disposed along water current fed, and wherein metal ion eluted from the electrodes are either silver ions, copper ions, or zinc ions, the ion elution unit further comprising:

a current detection unit for detecting current flowing between the electrodes, wherein the control unit is further configured to control the drive circuit based on the current flowing between the electrodes detected by the current detection unit, and, when the current detection unit detects that the current flowing between the electrodes is equal to or less than a predetermined level, the control unit controls the drive circuit to adjust at least one of the length of the first adjustable voltage application period, the length of the adjustable voltage application halt period, the length of the second adjustable voltage application period, or the length of the overall ion elution period.

13. An ion elution unit that generates metal ions from electrodes when a drive circuit applies a voltage between the electrodes, the ion elution unit comprising:

a water feed valve for feeding water to the ion elution unit; and a control unit configured to control the drive circuit when the water feed valve is feeding water to the ion elution unit to firstly apply the voltage between the electrodes by applying a positive voltage potential to a first electrode during a first adjustable voltage application period to cause the first electrode to act as an anode relative to a second electrode acting as a cathode so that the first electrode will provide the metal ions during the first adjustable voltage activating period, to secondly apply no voltage difference between the first and second electrodes during an adjustable voltage application halt period, and thirdly to apply the positive voltage to the second electrode during a second adjustable voltage application period to cause the second electrode to act as the anode relative to the first electrode acting as the cathode so that the second electrode will provide the metal ions during the second voltage activating period, the control unit being further configured to adjust at least one of the length of the first adjustable voltage application period, the length of the adjustable voltage application halt period, the length of the second adjustable voltage application period, and the length of an overall ion elution period that includes at least the first adjustable voltage application period, the adjustable voltage application halt period, and the second adjustable voltage application period to adjust the amount of eluted metal ions being produced to a desired level, wherein the electrodes are disposed along water current fed, and wherein metal ion eluted from the electrodes are either silver ions, copper ions, or zinc ions, the control unit also controlling the operation of the appliance that includes an operation requiring water mixed with metal ions generated by the ion elution unit, wherein the control unit is further configured to control the drive circuit to make the drive circuit adjust the overall ion elution period according to the amount of water used.

14. The appliance according to claim 13, wherein the appliance is a washer.

* * * * *